United States Patent [19]

Inoue et al.

[11] Patent Number: 5,532,765
[45] Date of Patent: Jul. 2, 1996

[54] IMAGE CORRECTION APPARATUS USING A DISPLAYED TEST SIGNAL

[75] Inventors: Ikunori Inoue, Takatsuki; Susumu Tsujihara, Neyagawa, both of Japan

[73] Assignee: Matsushita Electric Industrial Co., Ltd., Osaka, Japan

[21] Appl. No.: 210,306

[22] Filed: Mar. 17, 1994

[30]     Foreign Application Priority Data

| Mar. 17, 1993 | [JP] | Japan | 5-056688 |
| Mar. 17, 1993 | [JP] | Japan | 5-056690 |
| Mar. 17, 1993 | [JP] | Japan | 5-056691 |
| Mar. 19, 1993 | [JP] | Japan | 5-059864 |
| May 18, 1993 | [JP] | Japan | 5-115717 |
| Jun. 2, 1993 | [JP] | Japan | 5-131806 |

[51] Int. Cl.$^6$ ............................ H04N 17/00; H04N 17/02
[52] U.S. Cl. ............................ 348/807; 348/180; 348/177
[58] Field of Search .................... 348/177, 180, 348/181, 184, 807; H04N 17/00, 17/02

[56]     References Cited

U.S. PATENT DOCUMENTS

| 4,999,703 | 3/1991 | Henderson . | |
| 5,200,815 | 4/1993 | Tsujihara et al. | 358/60 |
| 5,298,985 | 3/1994 | Tsujihara et al. | 348/745 |
| 5,345,262 | 9/1994 | Yee et al. | 348/177 |

FOREIGN PATENT DOCUMENTS

| 58-38995 | 8/1983 | Japan . |
| 59-8114 | 2/1984 | Japan . |
| 62-226795 | 10/1987 | Japan . |
| 63-48987 | 3/1988 | Japan . |
| 64-54993 | 3/1989 | Japan . |
| 1-48553 | 10/1989 | Japan . |
| 3-38797 | 6/1991 | Japan . |

*Primary Examiner*—James J. Groody
*Assistant Examiner*—Nina N. West
*Attorney, Agent, or Firm*—Ratner & Prestia

[57]     ABSTRACT

An apparatus for correcting images includes: a test signal generator for generating a test signal; a display device for displaying the test signal in a region on a display screen; an imaging device for imaging the test signal displayed on the display screen in a scanning direction so as to produce an image signal having a rising linear portion and a falling linear portion along the scanning direction; a position calculator for calculating a position of a centroid of the image signal for each of R, G and B colors, based on the rising linear portion and the falling linear portion; an error detector for detecting an amount of error between the detected positions of the centroids for R, G and B colors; a correction circuit for correcting a convergence and a geometric distortion for the region, based on the amount of error.

9 Claims, 38 Drawing Sheets

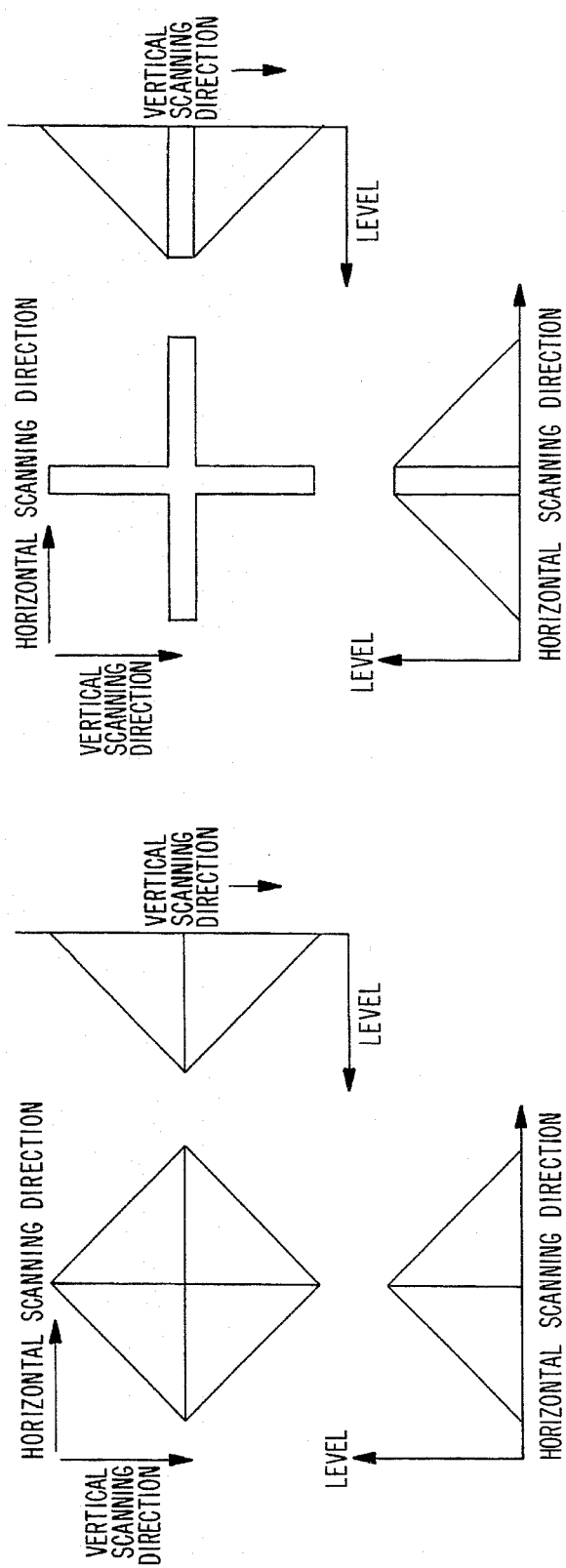

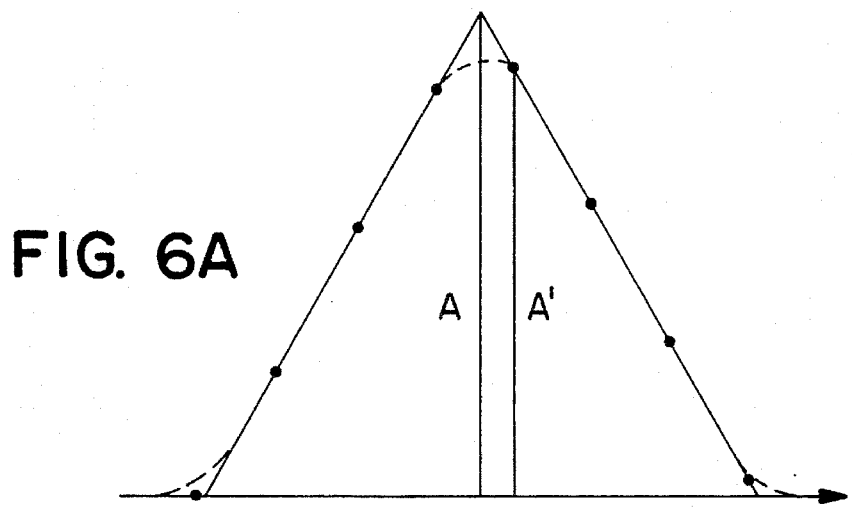
FIG. 6A
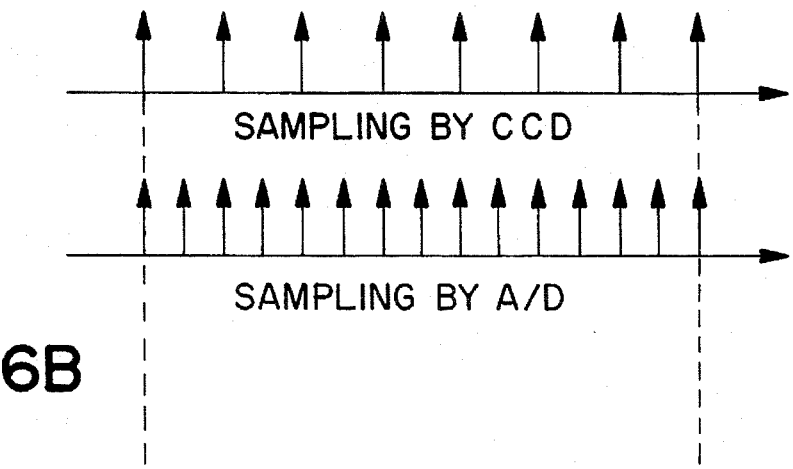
FIG. 6B
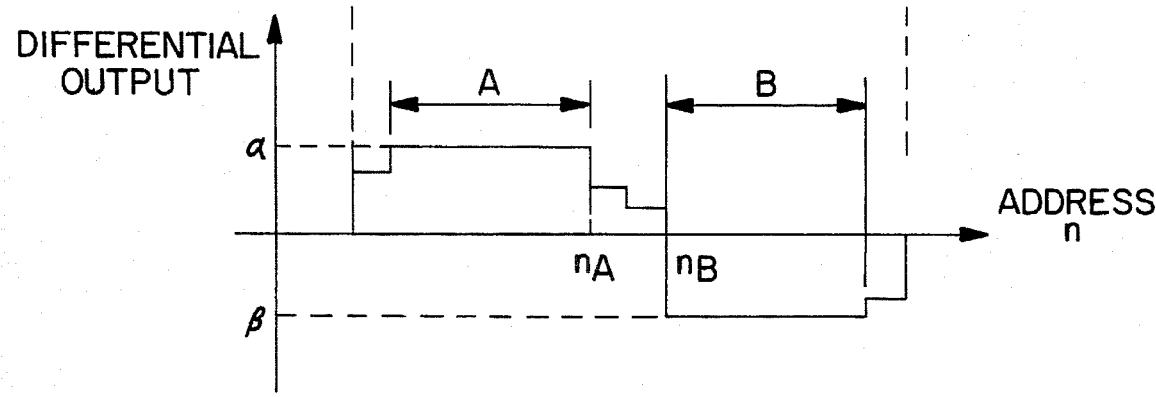

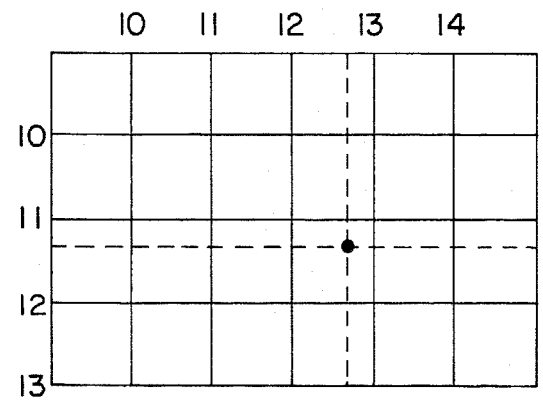
FIG. 7A
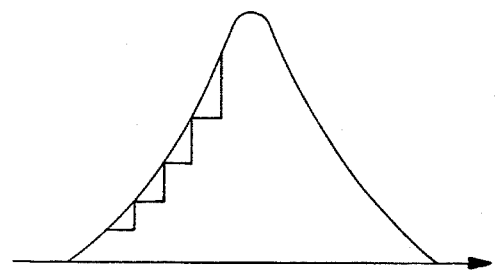
FIG. 7B
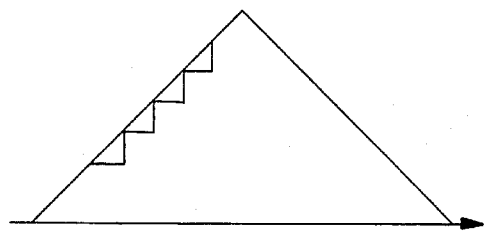
FIG. 8A
FIG. 8B

| | | | |
|---|---|---|---|
| WF1 | HORIZONTAL SAWTOOTH WAVEFORM | WF7 | HORIZONTAL SAWTOOTH WAVEFORM × VERTICAL PARABOLA WAVEFORM |
| WF2 | HORIZONTAL PARABOLA WAVEFORM | WF8 | DC |
| WF3 | VERTICAL SAWTOOTH WAVEFORM | WF9 | LEFT HALF OF HORIZONTAL SINE WAVEFORM |
| WF4 | VERTICAL PARABOLA WAVEFORM | WF10 | RIGHT HALF OF HORIZONTAL SINE WAVEFORM |
| WF5 | HORIZONTAL SAWTOOTH WAVEFORM × VERTICAL SAWTOOTH WAVEFORM | WF11 | UPPER HALF OF VERTICAL SINE WAVEFORM |
| WF6 | HORIZONTAL PARABOLA WAVEFORM × VERTICAL SAWTOOTH WAVEFORM | WF12 | LOWER HALF OF VERTICAL SINE WAVEFORM |

FIG. 20

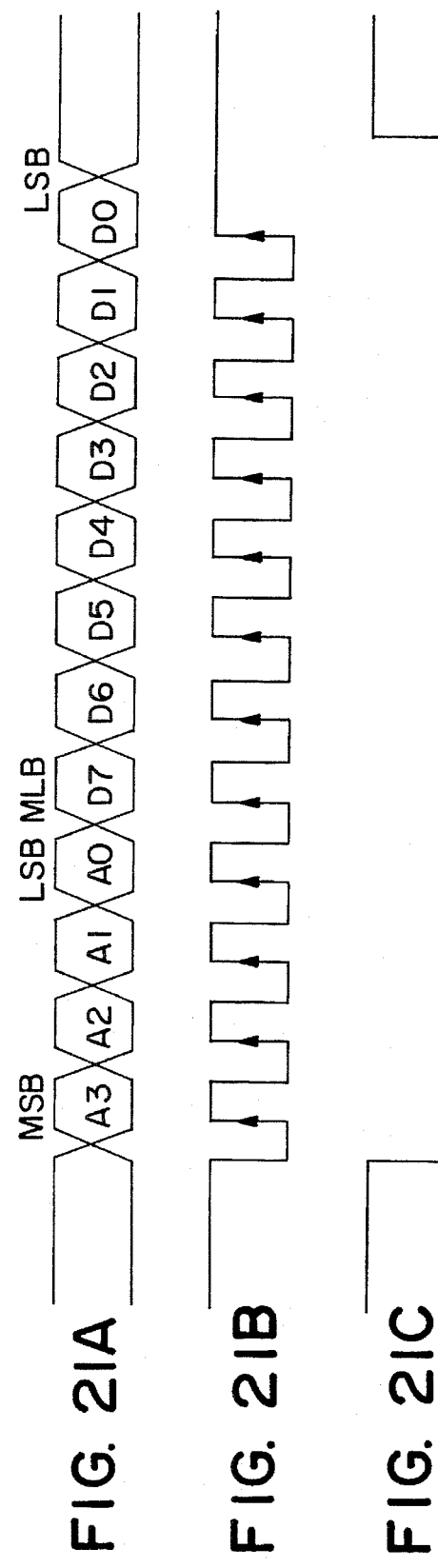

| CORRECTION WAVEFORM | CONVERGENCE COIL | CORRECTION CHANGE | CORRECTION WAVEFORM | CONVERGENCE COIL | CORRECTION CHANGE |
|---|---|---|---|---|---|
| (1) VERTICAL SAWTOOTH WAVEFORM | VERTICAL | VERTICAL AMPLITUDE | (3) HORIZONTAL SAWTOOTH WAVEFORM | VERTICAL | ORTHOGONAL CORRECTION (HORIZONTAL) |
| | HORIZONTAL | ORTHOGONAL CORRECTION (VERTICAL) | | HORIZONTAL | HORIZONTAL AMPLITUDE |
| (2) VERTICAL PARABOLA WAVEFORM | VERTICAL | VERTICAL LINEARITY | (4) HORIZONTAL PARABOLA WAVEFORM | VERTICAL | HORIZONTAL CURVE CORRECTION |
| | HORIZONTAL | VERTICAL CURVE CORRECTION | | HORIZONTAL | HORIZONTAL LINEARITY |

FIG. 22

FIG. 23B $l_{11}, l_{15}$ ——————
FIG. 23C $l_{12}, l_{14}$ 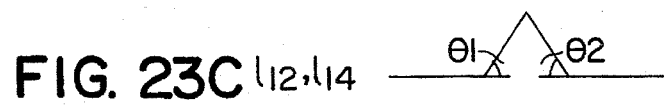
FIG. 23D $l_{13}$ 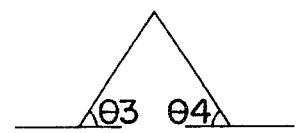

FIG. 23F $l_{21}$ ——————
FIG. 23G $l_{22}$ 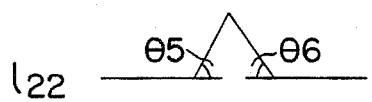
FIG. 23H $l_{23}$ 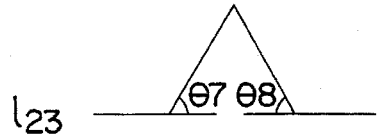
FIG. 23I $l_{24}$ 
FIG. 23J $l_{25}$ ——————

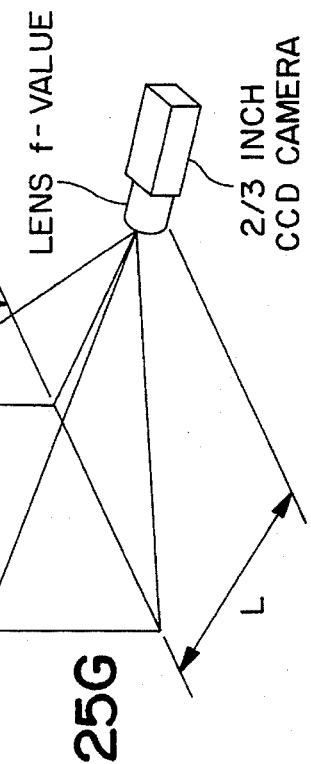
FIG. 25G
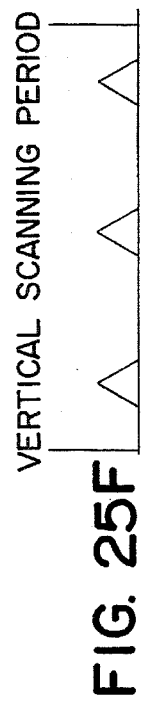
FIG. 25D
FIG. 25E
FIG. 25F
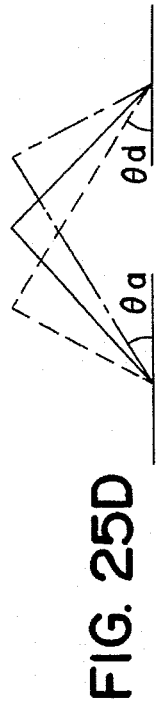
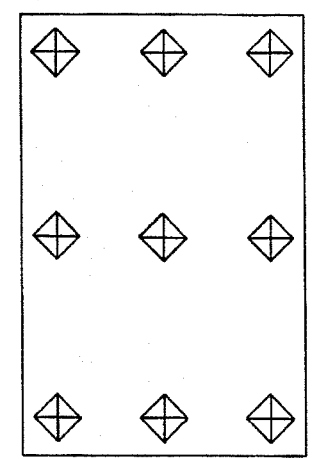
FIG. 25A
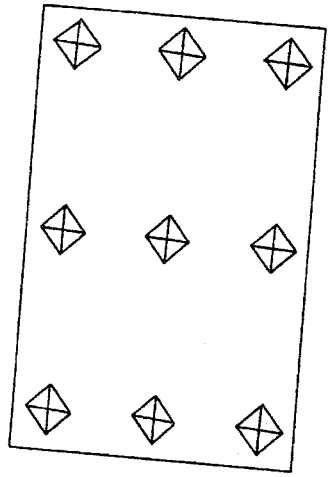
FIG. 25B
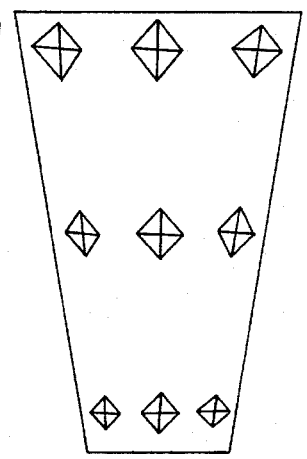
FIG. 25C

FIRST DIFFERENCE OF THE LINEAR SIGNAL

FIRST DIFFERENCE OF THE SATURATED SIGNAL

SECOND DIFFERENCE OF THE LINEAR SIGNAL

SECOND DIFFERENCE OF THE SATURATED SIGNAL

IMAGE CORRECTION APPARATUS USING A DISPLAYED TEST SIGNAL

BACKGROUND OF THE INVENTION

1. Field of the Invention

The present invention relates to an image correction apparatus for correcting images which are displayed in a color television receiver, and more particularly to an image correction apparatus for automatically making various corrections such as convergence correction, geometric distortion correction, brightness correction, and focus correction.

2. Description of the Related Art

Generally, in a projection type display or video projector for projecting enlarged images onto a screen by using three projection tubes respectively producing three primary colors, conditions such as color separation, brightness variation and out-of-focus may occur in displaying the images on the screen. This is because the incident angles of the respective projecting tubes with respect to the screen are different from one another.

These conditions can be corrected manually by viewing images with the eye. However, such a work requires a large amount of time for correcting images.

A digital convergence apparatus, implementing a method for achieving highly accurate convergence, is disclosed in Japanese Patent Publication No. 59-8114. An automatic convergence correction apparatus, implementing a method for automatically correcting deflection distortion, is disclosed, for example, in Japanese Patent Publication Nos. 3-38797 and 1-48553, and U.S. Pat. No. 4,999,703. A convergence error correcting method for detecting and correcting convergence errors is disclosed in Japanese Laid-open Patent Publication No. 64-54993. A convergence error correction apparatus for a projection type display, implementing a method for automatically detecting and correcting convergence errors, is disclosed in Japanese Laid-open Patent Publication No. 63-48987.

FIG. 38 shows a configuration of a prior art automatic convergence correction apparatus for automatically correcting misconvergence.

The automatic convergence correction apparatus includes a display device 101 which is to be adjusted for convergence; a signal generator 102 for generating a signal for adjusting the convergence; a signal selector 103; an imaging device 104 for capturing an image displayed on the display device 101; an image processor 105 for calculating the centroid and detecting the amount of misconvergence; and a controller 106 for controlling the signal generator 102, the signal selector 103 and the image processor 105.

The operation of the automatic convergence correction apparatus having the configuration mentioned above will be described below.

The signal generator 102 generates a repetitive pattern of a low frequency which has the waveform shown in FIG. 39. In FIG. 39, the x-axis corresponds to the horizontal direction of the display screen and y-axis corresponds to the vertical direction of the display screen. This repetitive pattern is supplied to the display device 101 through the signal selector 103. The display device 101 displays the repetitive pattern.

The imaging device 104 captures the repetitive pattern displayed on the display device 101 and supplies an image signal to the image processor 105. The image signal has a waveform including at least one crest portion at which the amplitude of the image signal takes a local maximum value. Hereinafter, the crest portion of the image signal is referred to as a centroid of the image signal.

The image processor 105 calculates a position of the centroid of the image signal for each of three primary colors R(red), G(green) and B(blue). The difference between the respective positions of the centroids for the primary colors is used to calculate the amount of misconvergence.

The calculation of the position of the centroid will be described below in detail. First, the image signal representing the repetitive pattern output from the imaging device 104 is A/D converted, and the resulting digital data is then linearly interpolated.

In FIG. 40, the solid curve hi(x) shows a part of the resulting image signal representing the repetitive pattern and the broken curve shows a second-order curve which is approximate to the curve hi(x). The remaining part of the resulting image signal is similar to the part shown in FIG. 40 and therefore, the description thereof is omitted.

The position of the centroid is calculated according to the following equation by the use of the second-order curve approximation method.

$$D = \int_{Li} \{hi(x) - (A \cdot x^2 + B \cdot x + C)\}^2 dx$$

The integral range $L_i$ of the equation depends on a threshold value hTH. Here, $A.x^2+B.x+C$ represents a second-order curve, and the coefficients A, B and C are determined so that the value D of the equation becomes the smallest.

More specifically, the coefficients A, B and C are determined so that the conditions of $\partial D/\partial A=0$, $\partial D/\partial B=0$ and $\partial D/\partial C=0$. Then, the position of the centroid x0 is given by $x0=-(B/2A)$.

The above-described second-order curve approximation method is repeatedly applied for each of the primary colors R, G and B so as to calculate the respective positions of the centroids. The automatic convergence correction is achieved by calculating the difference between the respective positions of the centroids as the amount of misconvergence and then adjusting the amount of misconvergence.

However, the above prior art automatic convergence correction apparatus has a problem in terms of operating speeds. This is because the image processor is required to perform complex operations since the second-order curve approximation method is employed to calculate the positions of the centroids of the repetitive patterns for adjusting convergence.

Furthermore, in the above mentioned prior art automatic convergence correction apparatus, an image signal having an undulating symmetric waveform is output from the imaging device 104. Based on the image signal, the image processor 105 calculates the position of the centroid by the use of the second-order curve approximation method. This presents a problem in that the accuracy of the centroid calculation is reduced when the image signal output from the imaging device 104 does not have an undulating symmetric waveform for whatever reason such as shading in the video projector and the gamma characteristics of the display device.

Moreover, in the prior art automatic convergence correction apparatus, the scanning line direction of the imaging device 104 is used as the reference in calculating the position of the centroid. No consideration is given to a positional relationship between the display device 101 and the imaging device 104. As a result, the apparatus has had the problem that when the imaging device 104 is tilted with respect to the horizontal scanning direction of the display device 101, the displayed image is tilted even if correction is made.

SUMMARY OF THE INVENTION

The apparatus for correcting images of this invention, includes: a test signal generator for generating a test signal; a display device for displaying the test signal in a region on a display screen; an imaging device for imaging the test signal displayed on the display screen in a scanning direction so as to produce an image signal having a rising linear portion and a falling linear portion along the scanning direction; a position calculating means for calculating a position of a centroid of the image signal for each of R, G and B colors, based on the rising linear portion and the falling linear portion; an error detecting means for detecting an amount of error between the detected positions of the centroids for R, G and B colors; a correction signal generating means for generating a correction signal for correcting a convergence and a geometric distortion for the region, based on the amount of the error; and a correcting circuit for correcting the convergence and the geometric distortion for the region, based on the correction signal.

In one embodiment, the image signal has a tetrahedron shaped waveform, where the tetrahedron has a base plane which is parallel to the display screen and a height in a level direction of the image signal.

In another embodiment, the position calculator calculates the position of the centroid by applying a linear approximation.

In another embodiment, the position calculator further calculates a relative positional relationship between the display device and the imaging device, based on the slope of the rising linear portion and the slope of the falling linear portion.

In another embodiment, the image signal is an analog signal, the position calculator includes: a clock signal generating circuit for generating a clock signal for sampling; an A/D convertor for converting the analog image signal into a digital image signal having a plurality of discrete levels by the use of the clock signal; a calculator for calculating the position of the centroid according to the digital image signal; a phase shift controller for shifting a phase of the clock signal under a condition that, when the digital image signal has a first discrete level at an edge of the clock signal, the digital image signal has a second discrete level which is different from the first discrete level at the corresponding edge of the phaseshifted clock signal.

In another embodiment, the display screen has at least one region each having a size, the correction signal generating means determines an order in which the correction signal is generated, based on the size of the region.

In another embodiment, the display screen has at least one region, the correction signal generating means determines an order in which the correction signal is generated, based on the amount of the error.

In another aspect of the present invention, an apparatus for correcting images, includes: a test signal generating means for generating a test signal; a display device for displaying the test signal on a display screen; an imaging device for imaging the test signal displayed on the display screen in a scanning direction so as to produce an image signal having at least one of a rising linear portion and a falling linear portion along the scanning direction; a level calculator for calculating a level of at least one of the rising linear portion and the falling linear portion; an error detecting means for detecting the amount of error between the detected level of the image signal and a level of a saturated signal due to saturation characteristics of the fluorescent material; a correction signal generator for generating a gamma correction signal for making a gamma correction, based on the amount of the error; and a correcting circuit for making the gamma correction, based on the gamma correction signal.

In one embodiment, the error detector detects the amount of error by the use of a differential signal of the image signal and a differential signal of the saturated signal.

In another embodiment, the image signal has a tetrahedron shaped waveform, where the tetrahedron has a base plane which is parallel to the display screen and a height in a level direction of the image signal.

According to the present invention, a test signal displayed on the display device is imaged so as to generate an image signal having at least two linear portions along the scanning line direction, a position of the centroid of the image signal is calculated based on the linear portions for each of the primary colors R, G and B, and image distortions are corrected based on the difference between the respective positions of the centroids.

By calculating the position of the centroid by the use of a linear approximation method, the position of the centroid can be calculated with optimum bit quantization, independently of the effects of the frequency characteristics of the imaging and display devices, such as the sampling rate of the CCD, and image distortions can be automatically corrected with high accuracy within a short period of time.

Thus, the invention described herein makes possible the advantage of providing an image correction apparatus capable of automatically adjusting convergence and various other image distortions, such as geometric distortion, with high accuracy and within a short period of time.

This and other advantages of the present invention will become apparent to those skilled in the art upon reading and understanding the following detailed description with reference to the accompanying figures.

BRIEF DESCRIPTION OF THE DRAWINGS

FIGS. 2A to 2G are views showing test signals for adjustment.

FIGS. 6A and 6B are views used to explain the centroid calculation operation.

FIGS. 7A and 7B are views showing addresses in an address map.

FIGS. 8A and 8B are views showing the level of quantization errors.

FIG. 20 is a view showing geometric distortion/convergence correction waveforms.

FIGS. 21A to 21C are views showing waveforms of correction data.

FIG. 22 is a view showing geometric distortion/convergence correction waveforms.

FIGS. 23A to 23J are views showing waveforms for explaining an operation for calculating the positional relationship between the display and imaging devices.

FIGS. 25A to 25G are views showing display screens for explaining the operation for calculating the positional relationship between the display and imaging devices.

DESCRIPTION OF THE PREFERRED EMBODIMENTS

Figure 1:
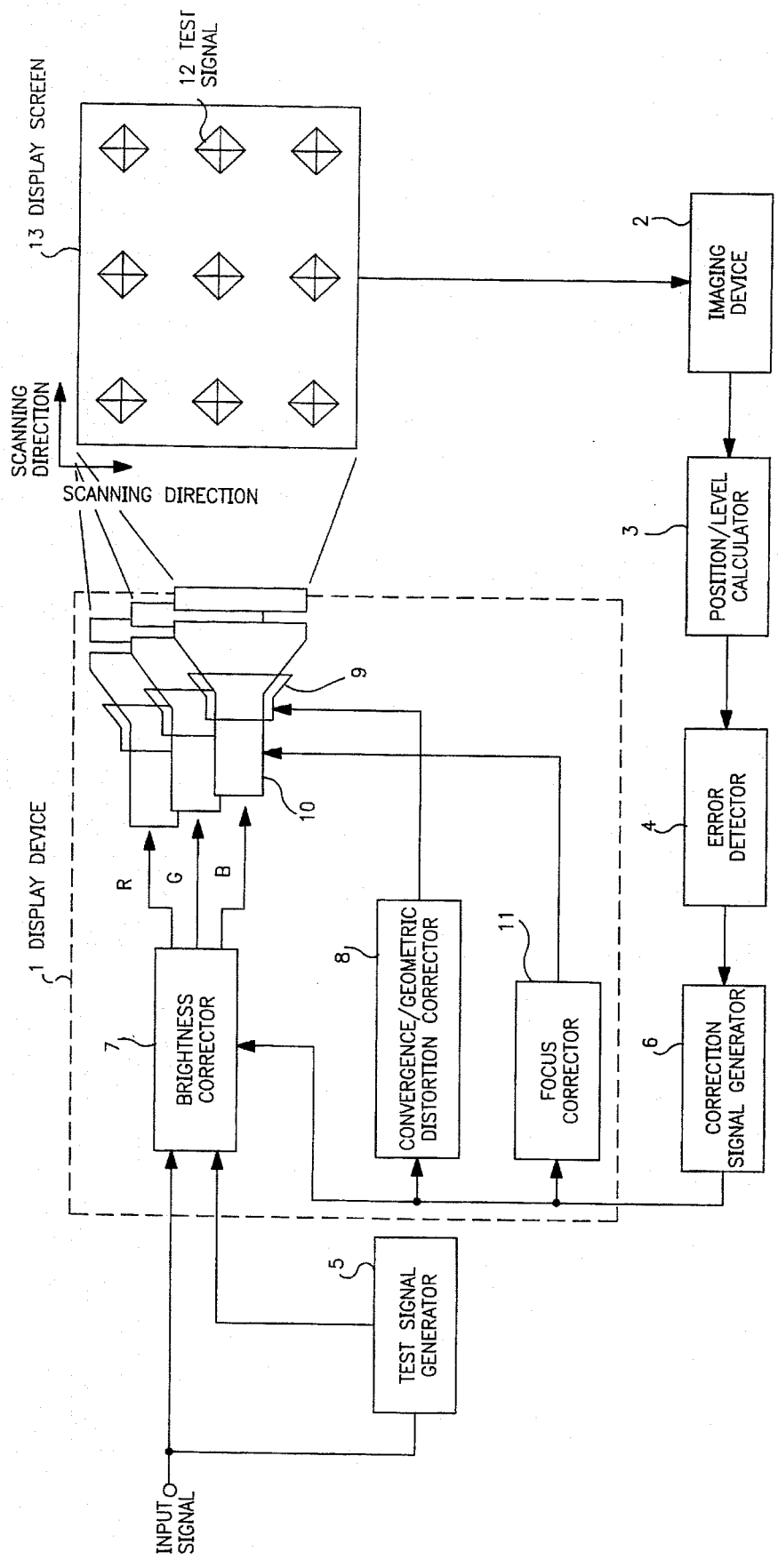
FIG. 1 is a block diagram showing the configuration of an image correction apparatus according to the present invention.

FIG. 1 shows a configuration of an image correction apparatus according to the present invention.

The image correction apparatus includes a display device 1 for displaying an image including a test signal; an imaging device 2 for imaging a test signal 12 for image correction which is displayed on a display screen 13 of the display device 1; a position/level calculator 3 for calculating a position and level of the imaged test signal 12; an error detector 4 for detecting error values with respect to convergence, geometric distortion and white balance, etc. for each of the primary colors R, G and B based on the output of the position/level calculator 3; a test signal generator 5 for generating a test signal for image correction; and a correction signal generator 6 for generating various correction signals based on the output of the error detector 4.

The display device 1 includes a deflection yoke 9 including a convergence yoke; a cathode-ray tube (CRT) 10 having a display screen 13; a brightness corrector 7 for correcting the brightness of the CRT 10; a convergence/geometric distortion corrector 8 for correcting convergence and geometric distortion; and a focus corrector 11 for correcting the focus.

The operation of the image correction apparatus having the configuration mentioned above will be described below.

First, various adjustments for the display device 1 will be briefly described.

An input signal is supplied to the display device 1 so as to display an image on the display screen 13. The test signal generator 5 generates a test signal used for various adjustments. The test signal is also supplied to the display device 1. The display device 1 displays the test signal on the display screen 13.

The imaging device 2 images the test signal 12 which is displayed on the display screen 13. Specifically, the imaging device 2 converts light from the display screen 13 into an electrical signal. Hereinafter, this photoelectric-converted signal is referred to as an image signal. The image signal is output from the imaging device 2 and is supplied to the position/level calculator 3.

Figure 2E:
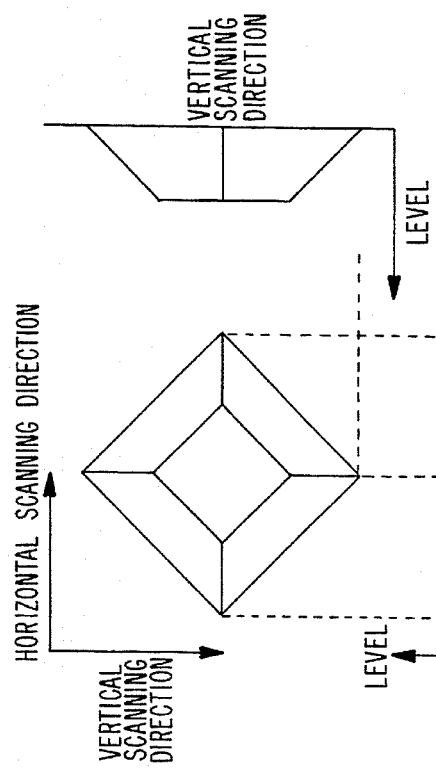
Figure 2F:
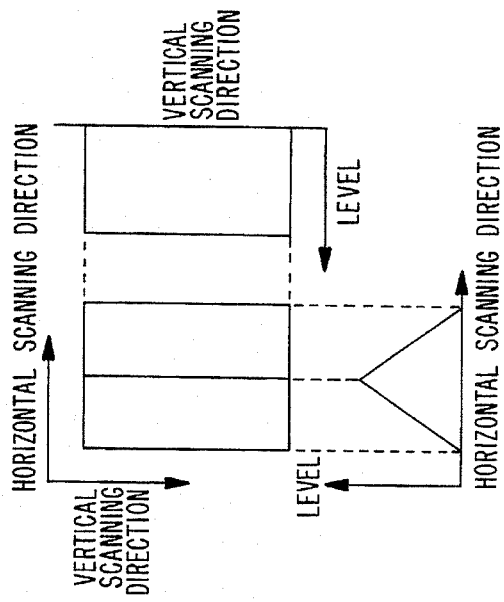
Figure 2G:
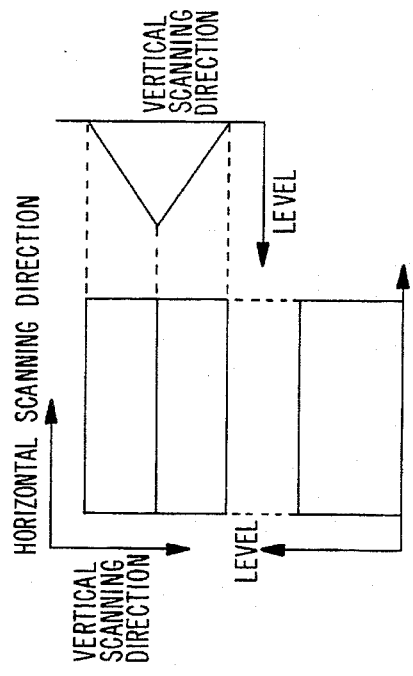

FIG. 2A shows an exemplary waveform of the image signal. This waveform is a tetrahedron shaped waveform, as is shown in FIG. 2B, where the tetrahedron has a base plane which is parallel to the display screen including an x-axis along the horizontal scanning direction and a y-axis along the vertical scanning direction and a height in the level direction of the image signal.

Alternatively, as long as a signal has at least one rising linear portion and at least one falling linear portion along at least one of the scanning directions, any signal can be used as a signal for adjustment. For example, signals having the waveforms shown in FIGS. 2B to 2G can be used as the signal for adjustment. Furthermore, the signal for adjustment is not limited to having a waveform which is symmetric to the scanning direction. The signal for adjustment may have a waveform which is not symmetric to the scanning direction.

The signal for adjustment shown in FIG. 2B is supplied to the position/level calculator 3 for each of the correction regions on the display screen 13. The position/level calculator 3 calculates a position of a centroid and a level of the image signal.

The error detector 4 calculates error values with respect to convergence, geometric distortion, white balance, etc. for each of the primary colors R, G and B, based on the output of the position/level calculator 3 and generates a detection signal indicating the error values.

The correction signal generator 6 receives the detection signal and generates various correction signals according to the detection signal. The correction signals are supplied to the respective correctors 7, 8 and 11 in the display device 1 so as to make an automatic correction.

In order to achieve linearity of the image signal in the level direction, it is necessary that gamma correction is made.

The gamma characteristics can be classified into two types. One is the CRT gamma characteristics which are derived from the CRT structure and the other is the gamma characteristics which are derived from the saturation of fluorescent material. Herein, the correction of the CRT gamma characteristics is described. The correction of the gamma characteristics derived from the saturation of fluorescent material will be described later in connection with white balance adjustments.

Generally, the relationship between the input voltage signal (E) and luminous output (L) of a CRT can be approximated by the following equation:

$$L = k.E^\gamma$$

where, the exponent $\gamma$ of the input voltage (E) represents the gamma characteristics of the CRT, typically $\gamma = 2.2$.

These gamma characteristics are uniquely determined for the CRT. Accordingly, if the test signal voltage (E) is converted into $E^{-\gamma}$ in the test signal generator 5, then the luminous output (L) is given by $L = k.E$, which is linearly proportional to the input. The conversion of the test signal voltage (E) into $E^{-\gamma}$ is achieved, for example, by using a ROM.

In this embodiment, it is assumed that the CRT gamma correction is made in the test signal generator 5. However, the CRT gamma correction may be made at any position in a data path from the test signal generator 5 to the position/level calculator 3.

In the following description of geometric distortion and convergence corrections using the test signal having a tetrahedron shaped waveform, it is assumed that the gamma characteristics are already corrected.

Figure 3:
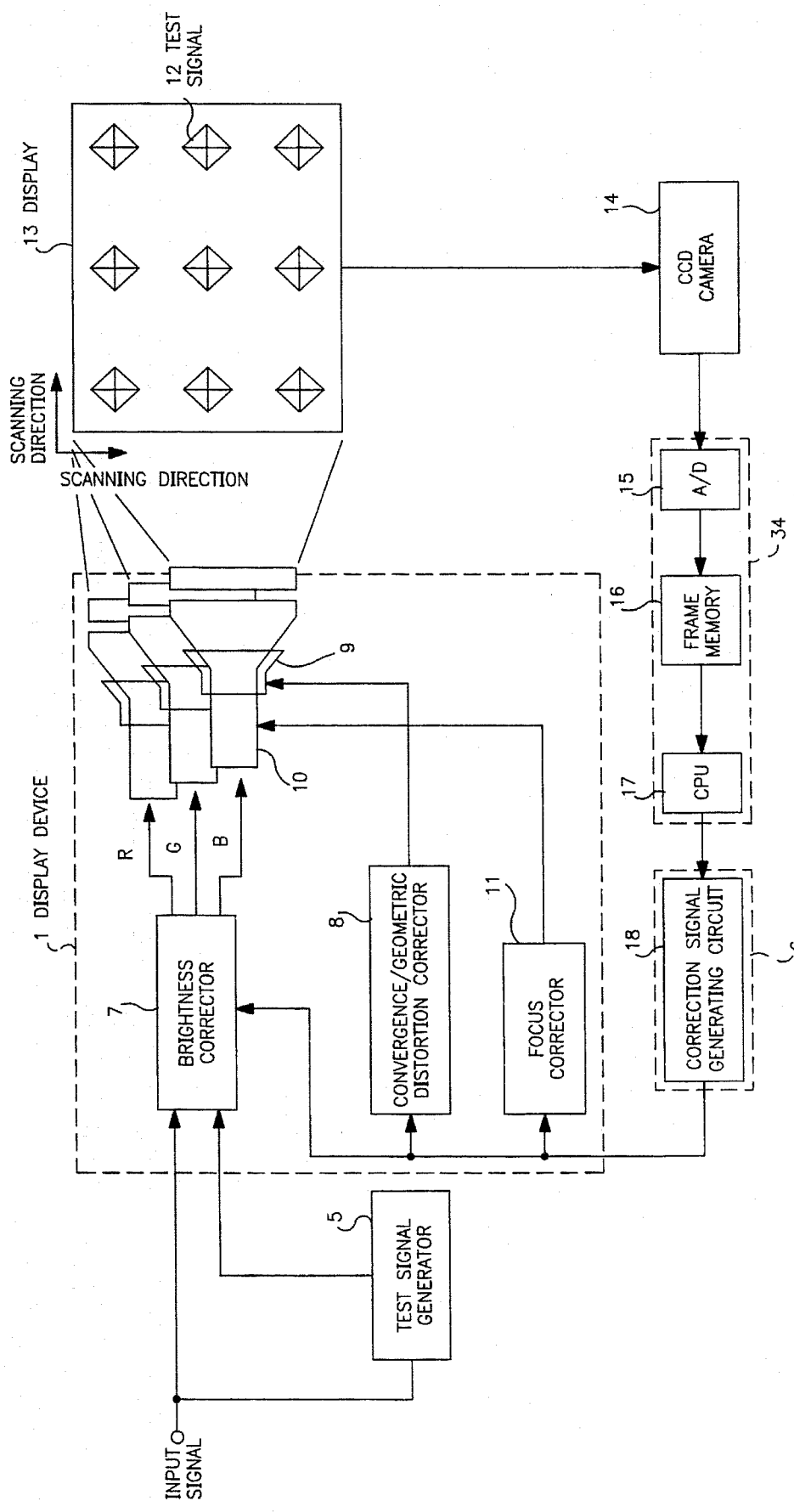
FIG. 3 is a block diagram showing the configuration of an image correction apparatus according to the present invention in more detail.

Hereinafter, the operation of the image correction apparatus will be described in detail with reference to FIG. 3. In FIG. 3, the position/level calculator 3 and error detector 4 includes an analog/digital (A/D) converter 15, a frame memory 16 and a CPU 17.

The imaging device 2 images light from the display screen 13. In this embodiment, a CCD camera 14 is used as the imaging device 2. However, any imaging device with a slower pulse response speed, such as a photodiode, can be used instead of the CCD camera 14. This is because the test signal is a low-frequency signal, and therefore, detection and correction with high accuracy can be accomplished by using an imaging device with slow pulse response speed and detection can also be made on an out-of-focus surface on which the image is not in focus.

It is preferable that a CCD camera is used as the imaging device 2 for at least the following reasons.

First, the CCD camera has a low geometric distortion of 1% or less. When information from the entire display screen is captured for geometric distortion correction, the geometric distortion of the imaging element itself cannot be neglected.

Second, since the information from the entire display screen is converted into a certain scanning frequency of the CCD camera, irrespective of the scanning frequency of the display device, subsequent image processing can always be performed under the same conditions.

Third, various types of display devices can be used since the monitoring distance for the focal distance can be changed by changing the optical lens.

The CCD camera 14 converts light from the display screen 13 into an electrical signal.

The photoelectric converted signal (i.e., the image signal) from the CCD camera 14 is supplied to the A/D 15. The A/D 15 converts the image signal shown in FIG. 2B into a digital signal.

The digital signal from the A/D 15 is stored in the frame memory 16 as display information.

The CPU 17 reads data corresponding to each of the correction regions from the frame memory 16, and calculates a position of a centroid and an error value.

The CPU 17 is required to calculate the position of the centroid with high accuracy even if a signal from a system with a low detection accuracy is supplied to the CPU 17. For example, such a system includes a black-and-white CCD camera 14 having about 380,000 pixels and an A/D 15 with a sampling frequency of about 14.32 MHz.

Figure 4A:
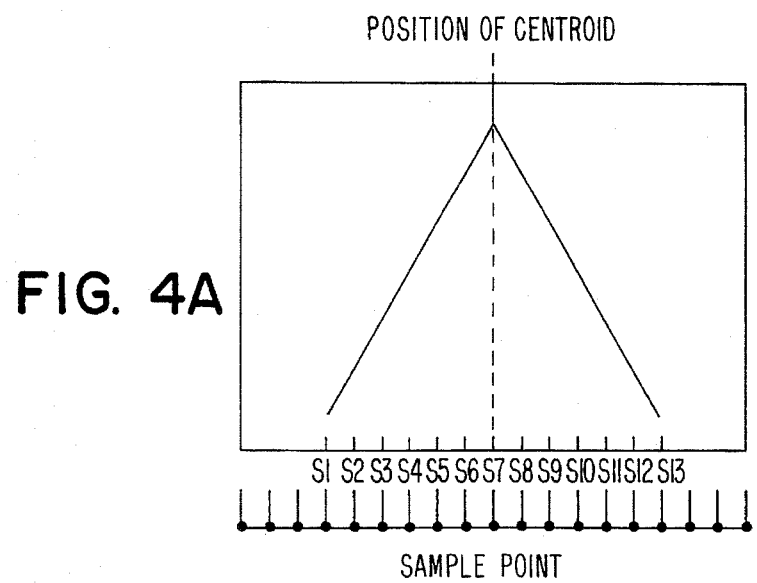
FIGS. 4A to 4C are views showing positions of the centroids of the image signals.

FIG. 4A shows a waveform of the image signal which is digitized by the A/D 15 at a sampling frequency f sap=14.32 MHz (a sampling cycle is 70 ns). In this case, the centroid of the image signal (i.e. the top portion of the image signal) is positioned at sample point S7.

Figure 4B:
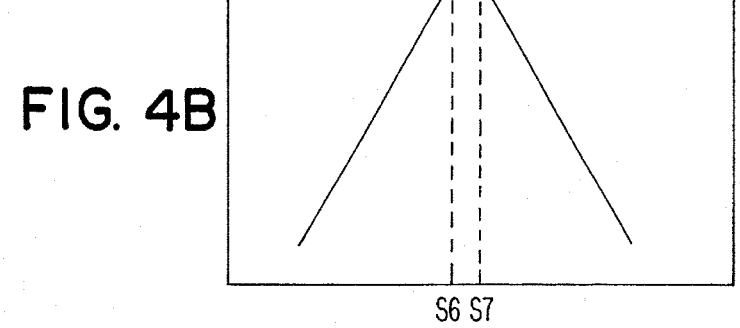

FIG. 4B shows a case where the centroid of the image signal is positioned between sample points S6 and S7. In this case, position detection with high accuracy is not possible because the sample points are not close enough to each other.

In order to detect the position with high accuracy, the CPU 17 of the present invention calculates a position of the centroid by the use of a linear approximation method, based on the voltages at sampling points which are neighbors of the position of the centroid.

Figure 4C:
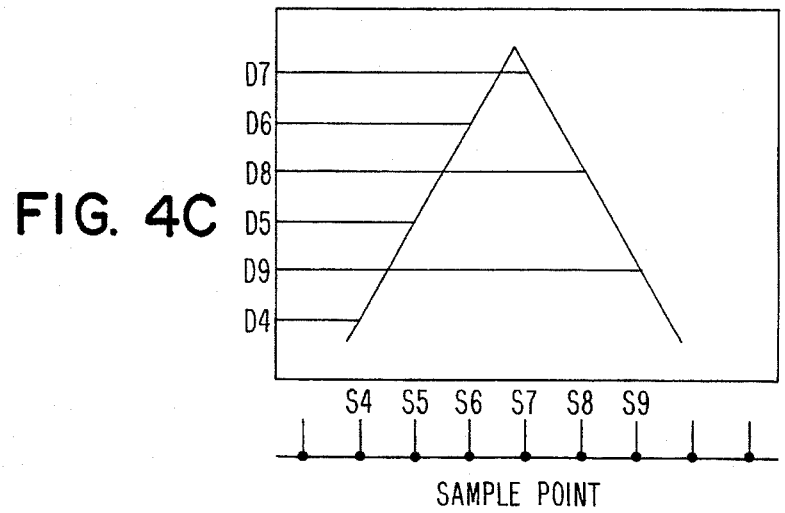

As shown in FIG. 4B, the image signal includes a rising portion and a falling portion. In the rising portion, the level of the image signal monotonically increases as data is sampled along the scanning direction. In the falling portion, the level of the image signal monotonically decreases as data is sampled along the scanning direction. At a point between the rising portion and the falling portion, the level of the image signal becomes locally maximum. In an example shown in FIG. 4C, data D4 to D6 which are sampled at sample points S4 to S6 are on the rising portion, while data D9 to D7 which are sampled at sample points S9 to S7 are on the falling portion.

The CPU 17 determines a first line according to the data D4 to D6 on the rising portion by the use of the linear approximation method, determines a second line according to the data D9 to D7 on the falling portion by the use of the linear approximation method, and calculates an intersection between the first line and the second line. Thus, the position of the centroid can be calculated with high accuracy even when the system has a low detection resolution.

Next, the operation for calculating the position of the centroid will be described with reference to FIGS. 5 and 6.

In FIG. 6A, a solid line indicates the original test signal, and a broken line indicates a signal obtained by interpolating the sampling signal from the CCD camera 14 by the use of the low-pass filter (LPF).

As is shown in FIG. 6A, the top portion of the test signal is truncated because of the low sampling frequency.

If it is attempted to calculate the centroid based on the truncated signal from the CCD camera 14, point A' will be erroneously judged as being the centroid of the test signal, while the actual centroid is at point A.

In order to avoid such a detection error, the calculation of the centroid is achieved by extending the linear segments excluding the truncated portion and calculating an intersection of the extended linear segments. The intersection is regarded as the centroid. This means that the same signal as the test signal, as indicated by the solid line in FIG. 6a, is obtained by calculation.

The display device 1 have a plurality of correction regions on the display screen 13. The position of the centroid is calculated for each of the test signals which correspond to the plurality of correction regions, respectively. Herein, for simplicity of explanation, the description of the calculation operation relates to only one of the correction regions. However, it will be noted that the same calculation operation is applied for any of the remaining regions in a similar manner.

Figure 5:
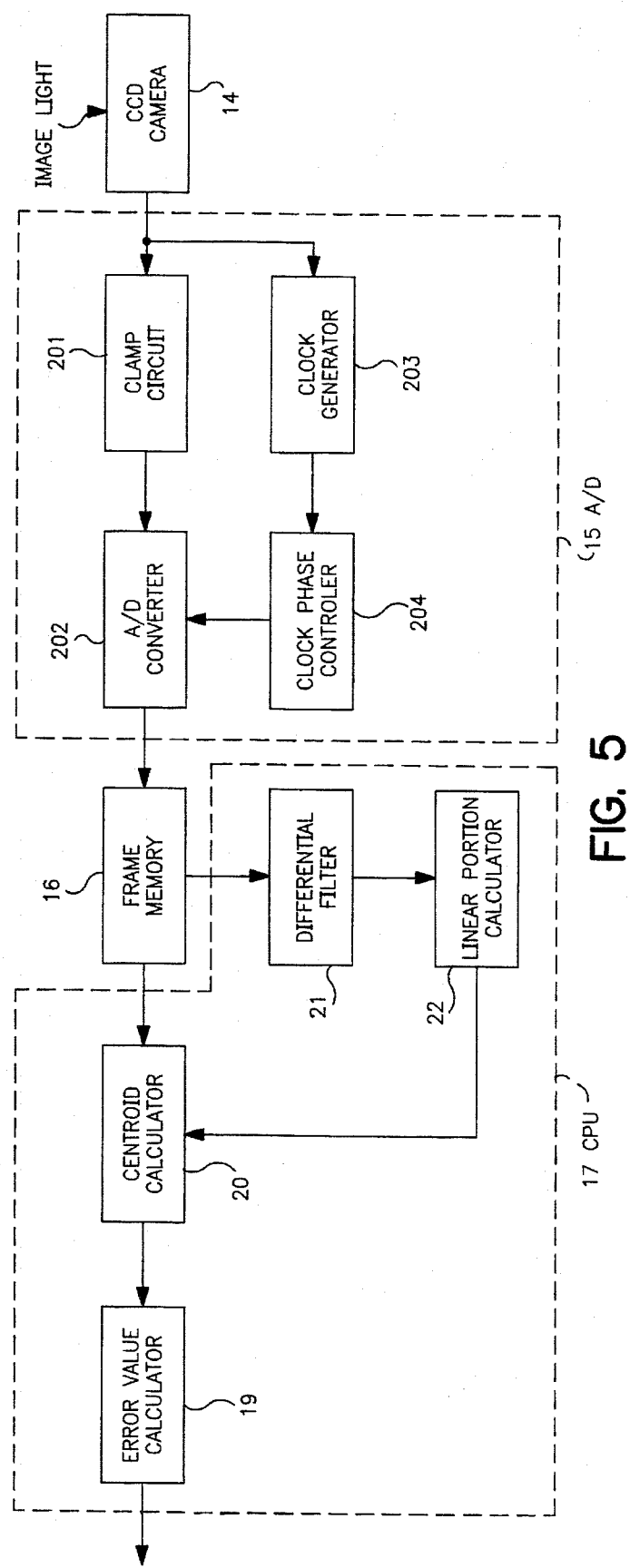
FIG. 5 is a block diagram showing the configuration of the A/D converter 15 and the CPU 17.

As shown in FIG. 5, the CPU 17 includes a centroid calculator 20, an error value calculator 19, a differential filter 21, and a linear portion detector 22.

The image signal stored in the frame memory 16 is input to the differential filter 21. The differential filter 21 calculates the temporal difference of the image signal and generates a differential signal.

FIG. 6B shows the differential signal output from the differential filter 21 in a case where the image signal shown in FIG. 6A is input to the differential filter 21.

The linear portion detector 22 detects a period in which the differential signal has a constant value. For example, in the case of FIG. 6B, the linear portion detector 22 detects a period A in which the differential signal has a constant value of $\alpha$ and a period B in which the differential signal has a constant value of $\beta$. The period in which the differential signal has a constant value corresponds to a period in which the slope of the image signal is constant. Portions where the slope of the image signal is zero are ignored.

Then, the linear portion detector 22 regards the image signal during the periods A and B as being effective. The linear portion detector 22 extends lines corresponding to the periods A and B by calculation, and calculates the point of intersection of the extended lines. The point of the intersection is determined as being the centroid.

Specifically, the point of the intersection is calculated in accordance with the following equation:

$$x = (DB - DA + \alpha.nA - \beta.nB)/(\alpha - \beta)$$

where, nA denotes an address of one end of the period A which is closer to the vertex portion of the image signal; nB denotes an address of one end of the period B which is closer to the vertex portion of the image signal; DA denotes a level of the image signal at the address nA; DB denotes a level of the image signal at the address nB; $\alpha$ denotes a constant slope during the period A; and $\beta$ denotes a constant slope during the period B, as is shown in FIG. 6B.

Thus, according to the present invention, the position of the centroid is determined by the use of the linear extrapolation method. This makes it possible to detect the position of the centroid with a high accuracy, even if a CCD camera having a low sampling frequency is used.

The position of the centroid thus obtained is mapped onto a point on an address map associated with the pixels of the CCD.

FIG. 7A shows an address map for a black-and-white CCD camera having 380,000 pixels. This address map contains addresses for 768 points (x1–x768) in the horizontal direction and 493 points (y1–y493) in the vertical direction.

FIG. 7B is an enlarged view showing a portion of the address map when the centroid (indicated by a solid black dot) of the image signal is mapped onto the address map. As shown in FIG. 7B, the position of the centroid is represented by a point on the address map. For example, the point has coordinates (x=12.7, y=11.3).

In this manner, the centroid of the image signal corresponding to each of the correction regions on the display screen is mapped onto the address map.

For increased accuracy of the centroid detection, the image signal should contain a larger number of linear portions along the scanning line direction. This will be explained with reference to FIGS. 8A and 8B.

FIG. 8A shows a conventional image signal having a second-order waveform such as a $SIN^2$ waveform, and FIG. 8B shows the image signal having a tetrahedron shaped waveform as in the present invention.

When these image signals are cut along horizontal scanning lines 1 in (n=1 to 5), the resulting waveform in either case has the characteristics of a rising and falling waveform. However, in the case of the conventional image signal having a quadratic curve-like waveform, quantizing errors are different for different signal levels, which prevents optimum quantization and thus degrades the detection accuracy. On the other hand, in the case of the image signal having a tetrahedron shaped waveform of the invention, since the signal is linear, high-accuracy calculation can be accomplished by selecting the optimum number of quantization bits.

Referring back to FIG. 5, a quantization method will be described below which minimizes the centroid calculation error resulting from quantization.

The A/D 15 includes a clamp circuit 201 for clamping the image signal; an A/D converter 202 for performing analog-to-digital conversion with 8-bit quantization; a clock generator 203 for generating a clock signal synchronous to the image signal; and a clock phase controller 204 for controlling the phase of the clock signal for a duration of time equal to or longer than 1 LSB of a rising/falling portion of the image signal.

The operation of the A/D 15 will be described in detail below with reference to FIGS. 9A to 9F.

Figure 9A:
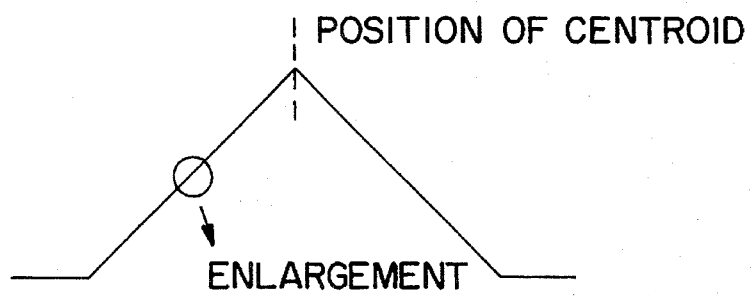
FIGS. 9A to 9F are views showing waveforms for explaining the centroid calculation operation.

An analog image signal having linear rising/falling portions shown in FIG. 9A is input to the A/D 15. The analog image signal is supplied to the clamp circuit 201 and the clock generator 203.

Figure 9B:
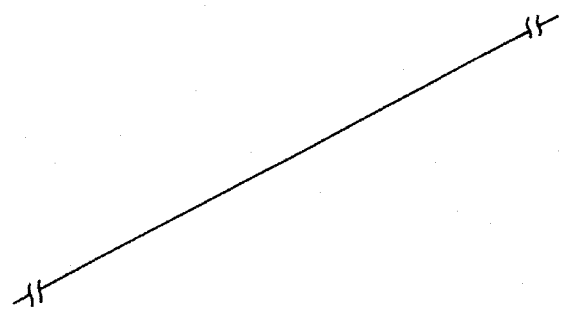

FIG. 9B is an enlarged view of the input signal of FIG. 9A at a point indicated by a hollow circle.

Figure 9C:
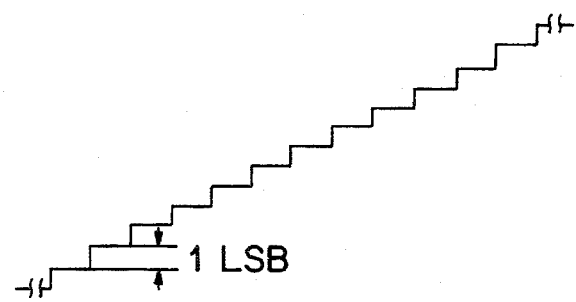
Figure 9D:
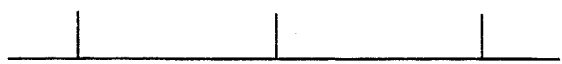
Figure 9E:
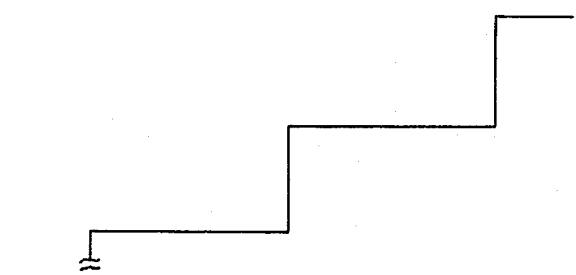
Figure 9F:
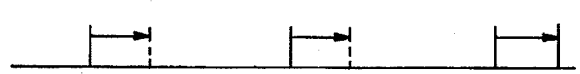

The clock ° generator 203 generates a clock signal shown in FIG. 9D, synchronized with the input signal. The clock signal is supplied to the A/D converter 202 through the clock phase controller 204. The A/D converter converts the input signal into the digital signal shown in FIG. 9E by sampling the input signal at the sampling rate determined by the clock signal shown in FIG. 9D.

FIG. 9C shows the digital signal obtained by sampling the input signal at the practically realizable highest clock frequency. As shown in FIG. 9C, the resulting digital signal has a plurality of discrete levels. The distance from a discrete level to the next discrete level is equal to 1 LSB. Accordingly, the distance from a discrete level to the next discrete level depends on the number of quantization bits of the A/D converter 202.

The clock phase controller 204 shifts the phase of the clock signal for a duration of time which is equal to or longer than a period corresponding to 1 LSB of the image signal shown in FIG. 9C. Specifically, it is assumed that the image signal has a first discrete level at one edge of the clock signal. In this case, the clock phase controller shifts the phase of the image signal so that the image signal has a second discrete level which is different from the first discrete level at the corresponding edge of the phase-shifted clock signal. The clock signal having the shifted phase is supplied to the A/D converter 202.

The digital signal output from the A/D converter 202 is supplied to the CPU 17 through the frame memory 16. The CPU 17 calculates the position of a centroid corresponding to the crest of the triangular signal shown in FIG. 9A arithmetically.

Figure 10:
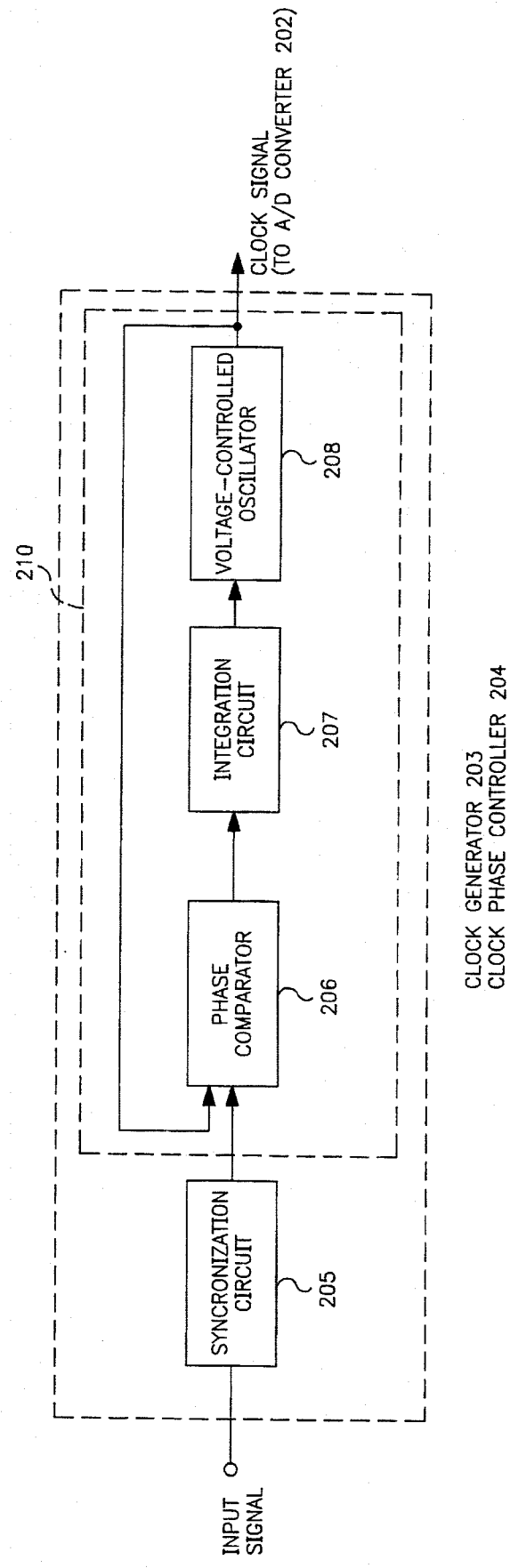
FIG. 10 is a block diagram showing an A/D section.

FIG. 10 shows the detail configuration of clock generator 203 and the clock phase controller 204. The clock generator 203 and the clock phase controller 204 include a synchronization circuit 205, a phase comparator 206, an integration circuit 207, and a voltage-controlled oscillator 208.

Next, the operation for clock signal phase control will be described with reference to FIGS. 10 and 11.

The image signal having rising/falling portions described above is supplied to the synchronization circuit 205. The synchronization circuit 205 extracts a synchronization signal which is synchronous to the input signal.

The phase comparator 206, integration circuit 207, and voltage-controlled oscillator 208 constitutes a phase-locked loop (PLL) 210. The synchronization signal from the synchronization circuit 205 is input to the phase-locked loop 210. The phase-locked loop 210 generates a clock signal which is synchronous to the input signal. For example, the phase-locked loop 210 generates a clock signal of 14.32 MHz for sampling 910 points during one horizontal scanning period. Such a clock signal is indicated by solid lines (S11, S21, S31) in FIG. 11B. The clock signal is supplied to the A/D converter 202.

Hereinafter, it is assumed that the number of quantization bits of the A/D converter 202 is 8. However, the present invention is applicable to any other number of quantization bits.

Figure 11A:
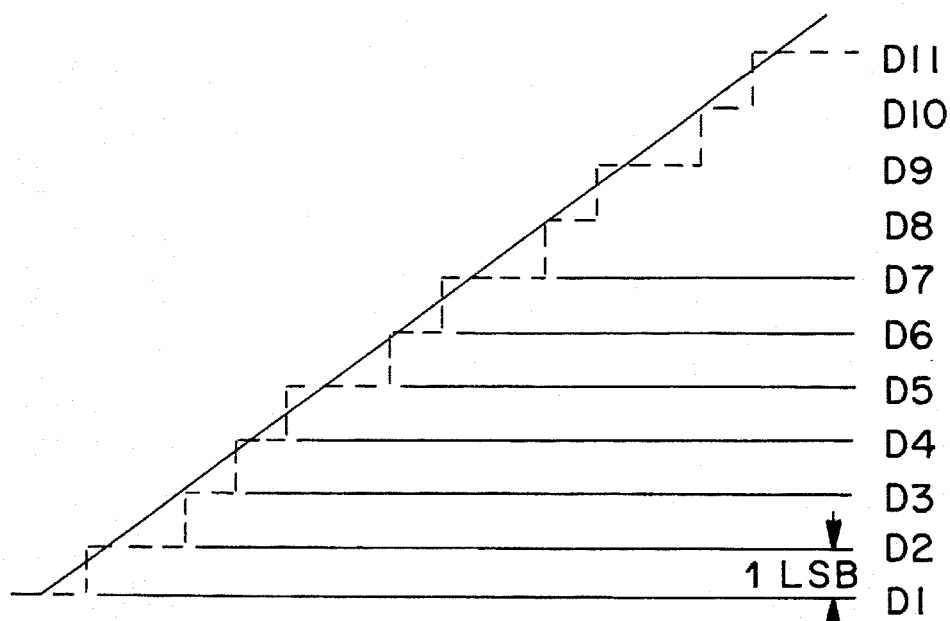
FIGS. 11a–11c are views showing waveforms for explaining the operation of the A/D section.
Figure 11B:
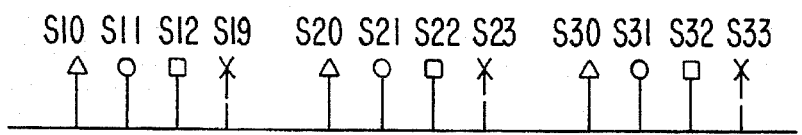
Figure 11C:
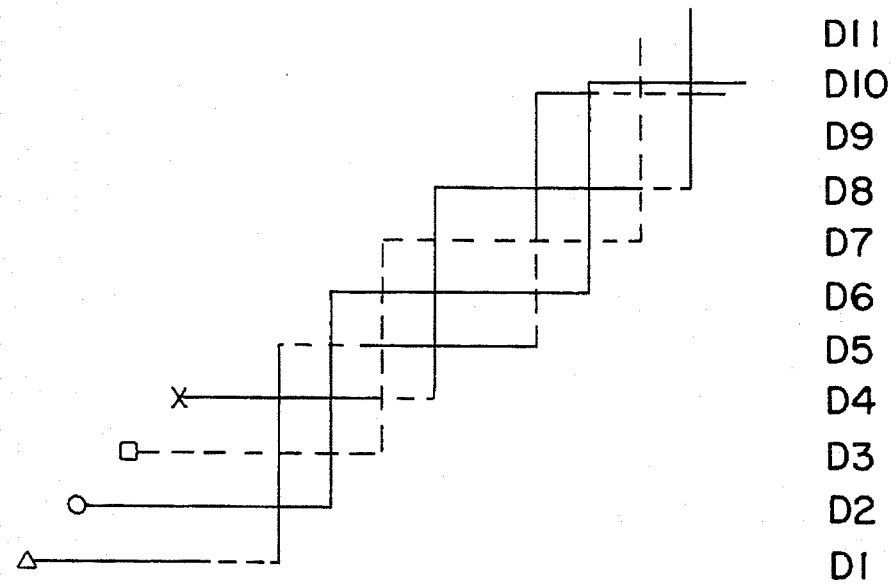

In FIG. 11A, a solid line indicates an analog linear signal and a broken line indicates a digital signal obtained by sampling the analog linear signal at the practically realizable highest possible sampling frequency. In FIG. 11C, a solid line indicates a digital signal obtained by sampling the analog linear signal at the clock signal (S11, S21, S31) indicated by the solid line in FIG. 11B.

As shown in FIG. 11C, a quantization error occurs when the analog signal is converted into a digital signal by the use of the clock signal of 14.32 MHz.

The present invention provides a method and circuit capable of reducing the quantization error by achieving the ideal condition shown in FIG. 11A even if the analog signal is converted into a digital signal by the use of the clock signal of 14.32 MHz. The reduction of the quantization error is helpful for improving the detection accuracy in detecting the position of the centroid.

The reduction of the quantization error is achieved by sampling the analog image signal at the timing (S10, S12, S13; S20, S22, S23; S30, S32, S33) indicated by a dotted line, dashed line, two-dot chain line, respectively in FIG. 11B and performing an average operation at a calculation step in the CPU 17. The timing (S10, S12, S13; S20, S22, S23; S30, S32, S33) is obtained by shifting the phase of the reference clock signal (S11, S21, S31) indicated by the solid line in FIG. 11B.

To provide the necessary amount of phase control applied to the clock signal, the phase is shifted by a time equal to or longer than a period corresponding to 1 LSB of the slope of the input signal having rising/falling portions. This phase control is accomplished by causing jitter in the clock signal output from the PLL circuit by using a filter constant of the integration circuit 207 shown in FIG. 10.

Next, the detection accuracy of the position of the centroid will be described with reference to FIGS. 12, 13 and 14.

Figure 12:
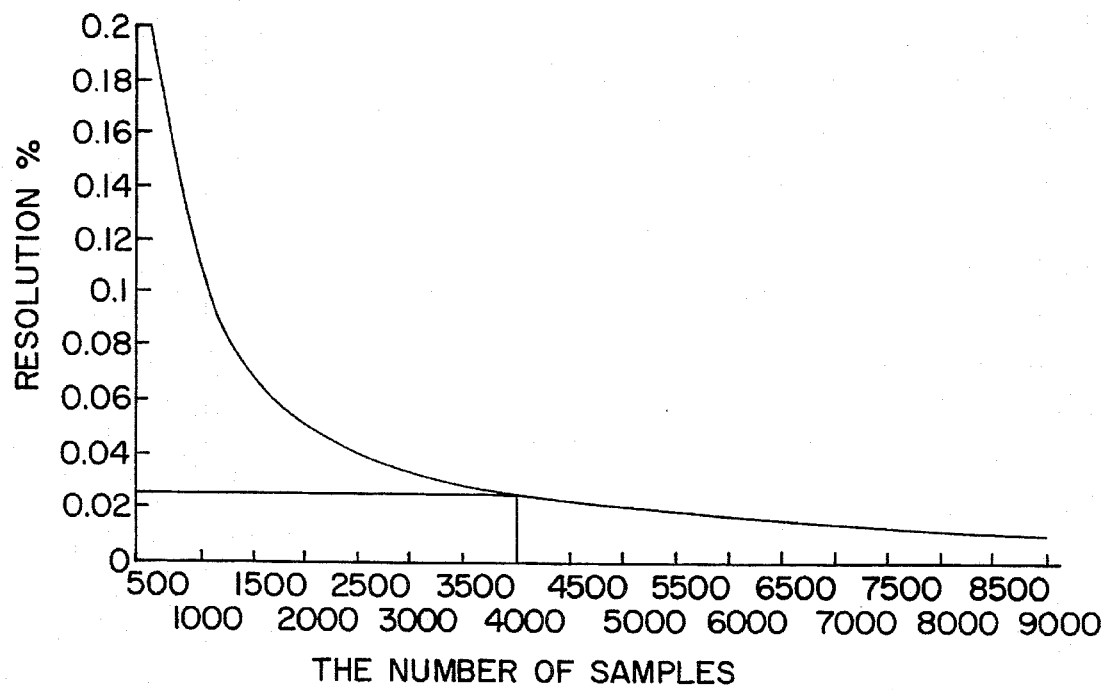
FIG. 12 is a characteristic diagram for explaining the operation of the A/D section.

FIG. 12 shows the relationship between the number of samples, i.e. the sampling frequency, and resolution. In General, a high definition television (HDTV) requires positional detection accuracy within a 0.5 scanning line in order to prevent resolution degradation due to misconvergence. This means that the HDTV requires a resolution of about 0.025 for about 4,000 samples, and a clock frequency of about 140 MHz for sampling.

Figure 13:
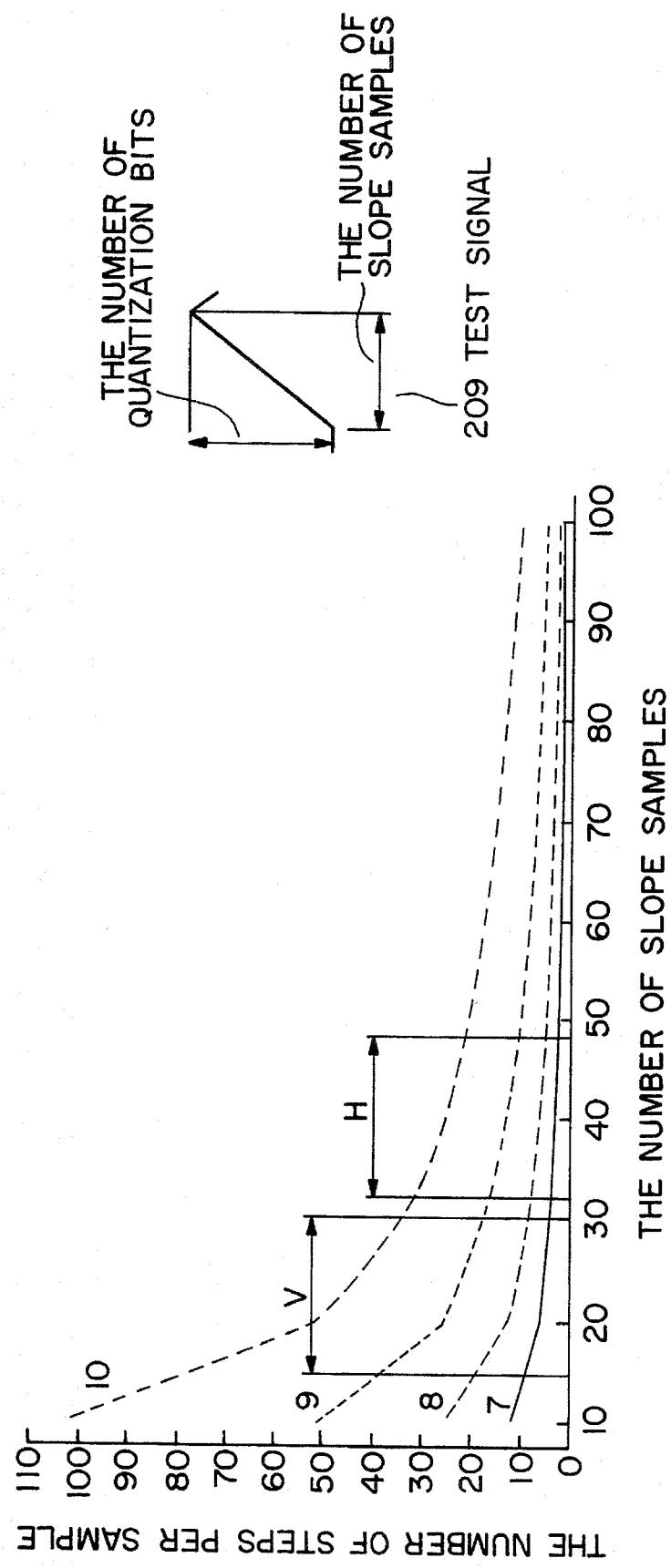
FIG. 13 is a characteristic diagram for explaining the operation of the A/D section.

FIG. 13 shows the characteristics of the number of steps per sample. The characteristics of the number of steps per sample depend on the number of slope samples and the number of quantization bits for a test signal 209 having rising/falling portions.

Figure 14:
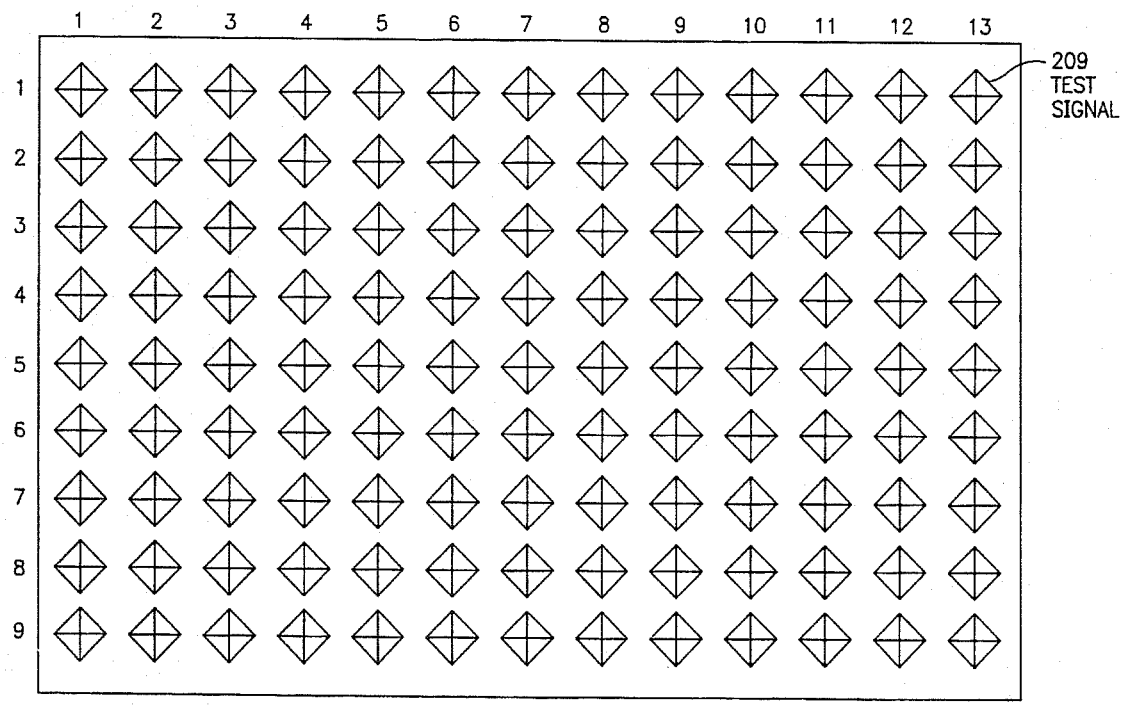
FIG. 14 is a view showing a test signal pattern.

It is assumed that 117 test signals 209 having rising/falling portions are displayed on the display screen 13, where 13 test signals 209 in each row in the horizontal direction and 9 test signals 209 in each column in the vertical direction, as is shown in FIG. 14. In this case, the number of slope samples in the horizontal direction is 32–48 samples (for NTSC-HDTV), and the number of slope samples in the vertical direction is 16–30 samples (for NTSC-HDTV). With 8-bit quantization, the number of steps is 9 or less in the horizontal direction, and 20 or less in the vertical direction.

Figure 15:
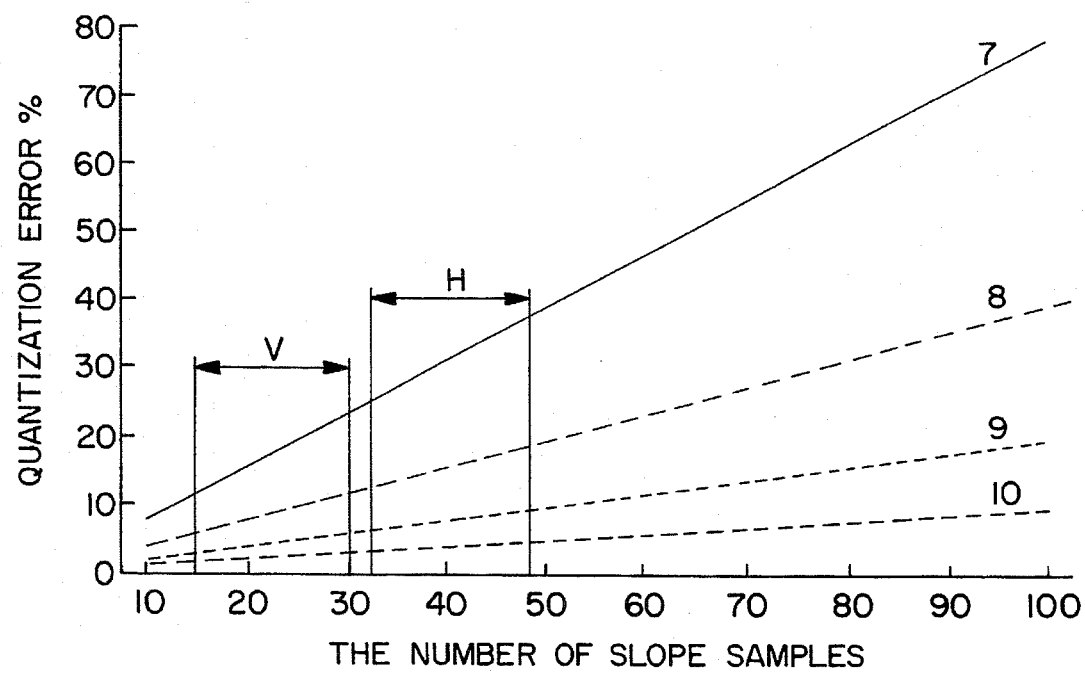
FIG. 15 is a characteristic diagram for explaining the operation of the A/D section.

FIG. 15 shows the quantization error characteristics for various numbers of quantization bits. As shown in FIG. 15, with 8-bit quantization, a quantization error of 13 to 19% occurs in the horizontal direction, and 6 to 12% in the vertical direction, for the sampling clock frequency.

A minimum of 9 quantization bits are required if the centroid is to be detected with high accuracy. However, the present invention provides a method and circuit capable of detecting the position of the centroid with high accuracy by reducing the quantization error to a level close to the ideal condition.

Figure 16:
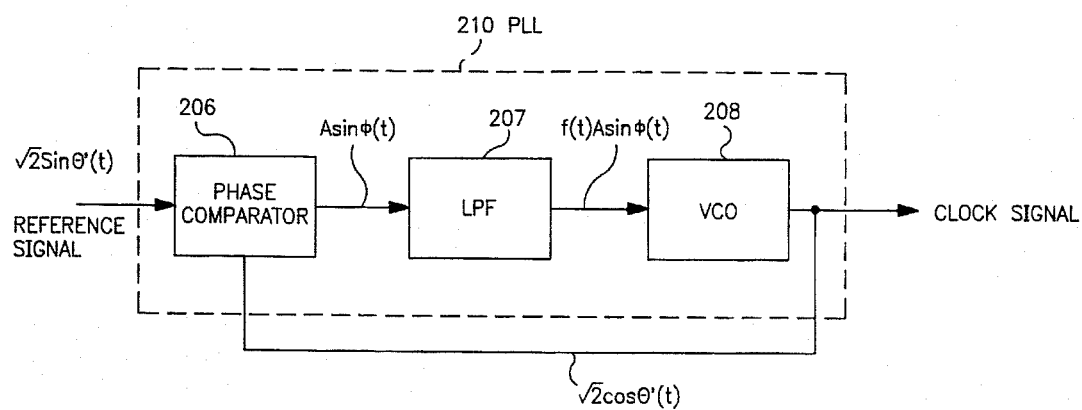
FIG. 16 is a block diagram for a clock generator and phase controller in the A/D section.

Next, the method of controlling the phase of the clock signal will be described in detail with reference to FIGS. 16, 17 and 18.

The PLL 210 includes the phase comparator 206, low-pass filter (integration circuit) 207, and voltage-controlled oscillator (VCO) 208, as mentioned above. Herein, it is assumed that the reference signal is represented by $\sqrt{2}\sin\theta(t)$ and the clock signal from the VCO 208 is represented by $\sqrt{2}\cos\theta'(t)$. The output Y(t) of the phase comparator 206 is obtained by the product of the reference signal and the clock signal. Accordingly, the output Y(t) of the phase comparator 206 is represented by the following equation.

$$Y(t)=A\{\sin\theta(t)\times\cos\theta'(t)\}$$

By transforming this equation by the use of the addition axiom, the following equation is obtained:

$$Y(t)=A. \sin \{\theta(t)-\theta'(t)\}+A. \cos \{\theta(t)+\theta'(t)\}$$

where, the first term represents the frequency difference between the two signals, the second term represents the sum of the two signals, A denotes the degree of amplification, and $\theta(t)-\theta'(t)$ and $\theta(t)+\theta'(t)$ indicate the respective signal phases.

Next, let the free-running frequency of the VCO 208 be $\omega_0$, and the sensitivity of the VCO 208 be K. Since the oscillation frequency is obtained by differentiating the phase $\theta'(t)$ of the clock signal of the VCO 208, the following equation is given.

$$d\theta'(t)/dt=\omega_0+A.K. \sin \{\theta(t)-\theta'(t)\}$$

In this equation, if the free-running frequency of the VCO 208 is equal to the frequency of the reference signal and if their phases match, then the second term of sine becomes 0, and therefore, the following equation is obtained.

$$d\theta'(t)/dt=\omega_0$$

If the free-running frequency of the VCO 208 deviates from the frequency of the reference signal, then the VCO frequency is corrected by the second term by an amount equal to the deviation so that the VCO frequency is maintained identical with the reference signal frequency.

However, even if the frequency is made identical, a phase difference occurs because the second term is not 0. This phase error becomes smaller as the coefficients A and K become larger.

Furthermore, the stationary phase error in the primary loop of the LPF 207 is proportional to the arc sine of the difference between the frequency of the reference signal and the free-running frequency of the VCO 208, and is inversely proportional to the arc sine of the loop gain.

Figure 17A:
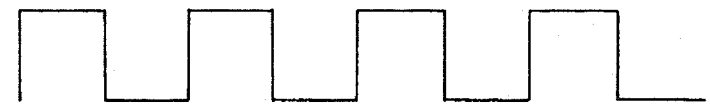
FIGS. 17A to 17E are views showing waveforms for explaining the operation of the clock generator and phase controller in the A/D section.
Figure 17B:
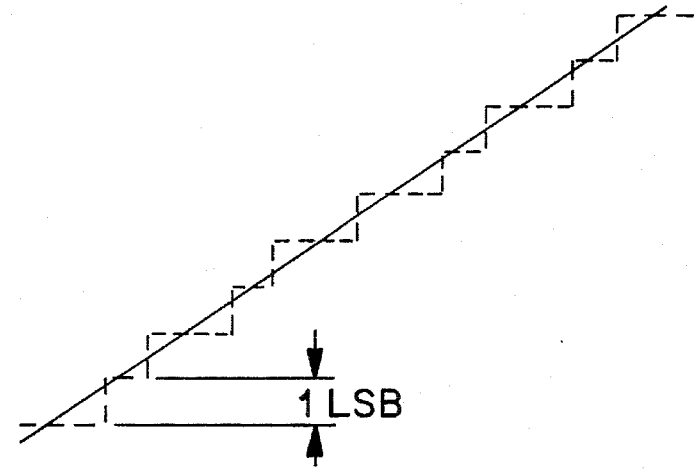
Figure 17C:
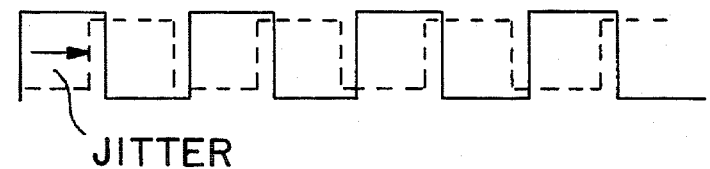
Figure 17D:
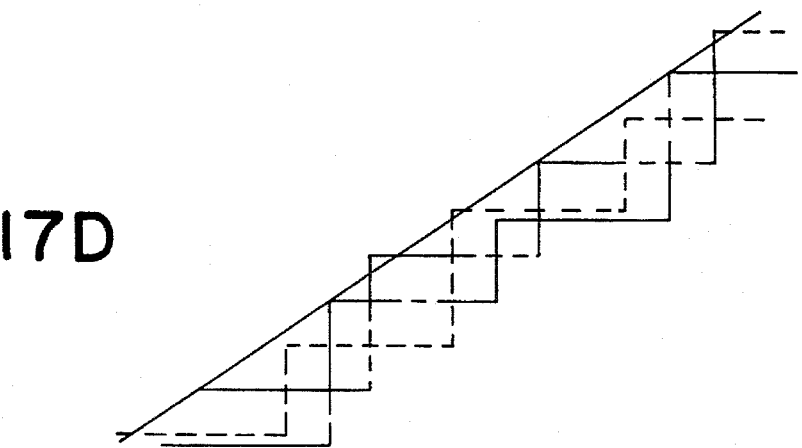

FIG. 17A shows an ideal clock signal with no phase difference (with no jitter). FIG. 17B shows an input analog signal having a rising portion (indicated by a solid line) and a quantized signal (indicated by a dashed line) obtained by A/D conversion. FIG. 17C shows a clock signal in which a phase error of a time corresponding to 1 LSB is introduced. FIG. 17D shows a signal which is A/D converted by using the three kinds of clock signals shown in FIG. 17E.

Figure 17E:

The detection of the position of the centroid with high accuracy is achieved by varying the phase of the clock signal randomly as is shown in FIG. 17E, and by performing an average operation based on the quantization error conditions.

As described above, the A/D conversion is performed using a clock signal with its phase varied randomly by a time equal to or longer than a period corresponding to 1 LSB of the slope of the input signal having rising/falling portions, and mathematical operations are performed to calculate the centroid of the input signal thus A/D converted close to the ideal condition of the practically realizable highest sampling frequency. Thus, the position of the centroid can be detected with high accuracy at a limited clock frequency and with a small number of quantization bits. This makes it possible to realize the calculation by the use of simple circuitry and simple processing procedures.

Next, a method of calculating an error value based on the position of the centroid obtained in the above manner.

Figure 18A:
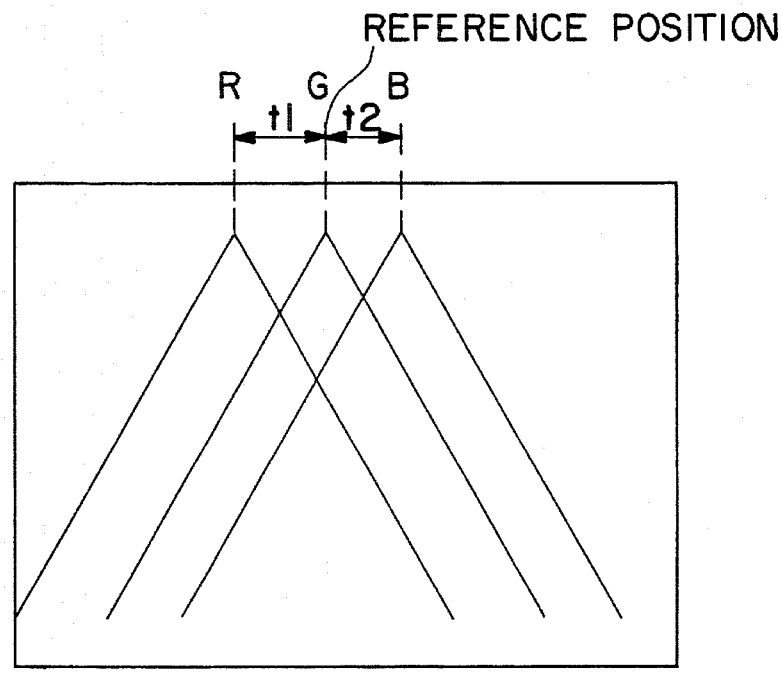
FIGS. 18A and 18B are views showing waveforms for explaining an error calculation operation for geometric distortion and convergence corrections.

For calculation of a convergence error, the G signal is used as the reference signal, and an error value t1 in the leftward direction is calculated for the R signal, and an error value t2 in the rightward direction for the B signal, as is shown in FIG. 18A.

Figure 18B:
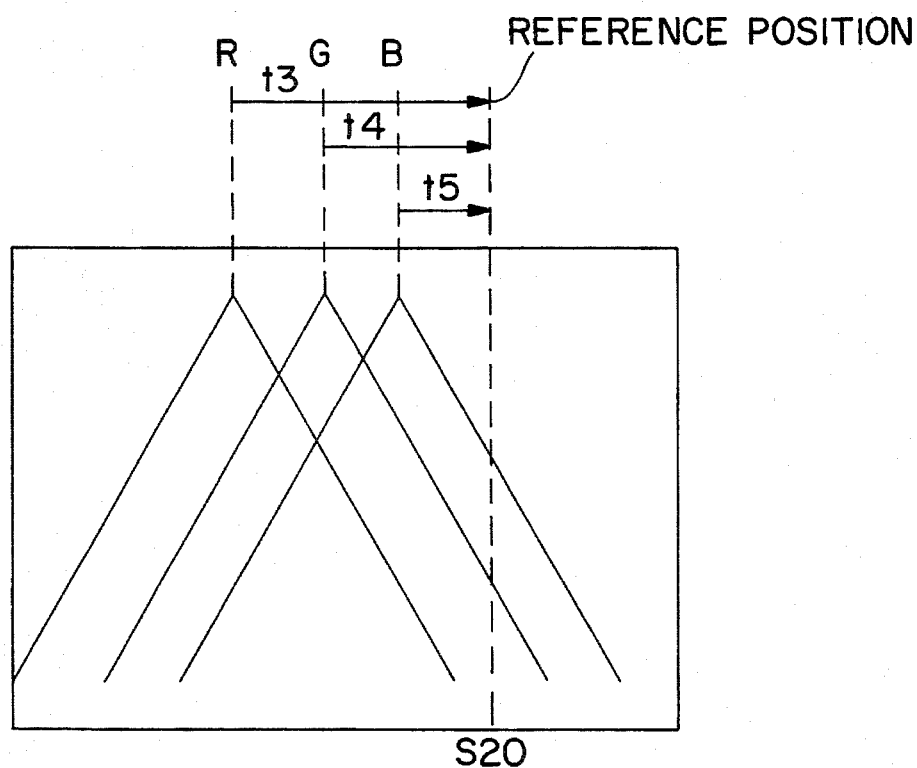

For calculation of geometric distortion, a specific sample point S20 is used as the reference point, and an error value t3 in the leftward direction is calculated for the R signal, an error value t4 in the leftward direction for the G signal, and an error value t5 in the leftward direction for the B signal, as is shown in FIG. 18B.

The calculated position of the centroid and the calculated error values is stored in a memory in connection with addresses of the sample points. For example, for calculation of geometric distortion, addresses of 768 points (x1–x768) in the horizontal direction and 493 points (y1–y493) in the vertical direction are used as respective reference signals.

The position of the centroid and the error values calculated by the CPU 17 are supplied to the correction signal generating circuit 18. The correction signal generating circuit 18 generates correction signals for convergence and geometric distortion corrections. These correction signals are supplied to the convergence/geometric distortion corrector 8 in the display device 1.

The operation of the correction signal generating circuit 18 for generating convergence correction waveforms will be described in detail below with reference to FIGS. 19, 20 and 21.

Figure 19:
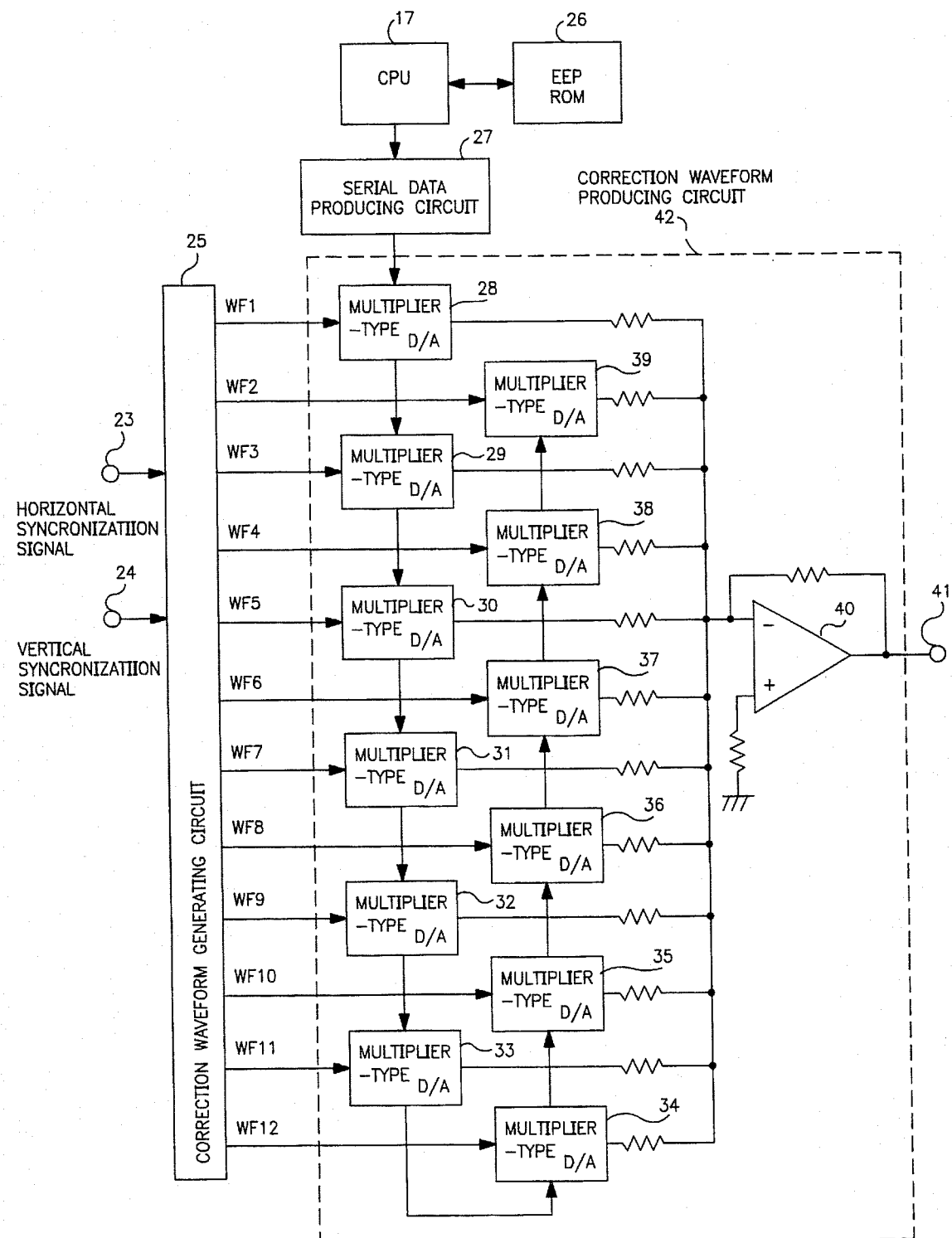
FIG. 19 is a block diagram for a geometric distortion/convergence correction waveform generating section.

As shown in FIG. 19, the correction signal generating circuit 18 includes a correction waveform generating circuit 25 for generating fundamental correction waveforms, and a correction waveform producing circuit 42 for producing various correction signals having waveforms obtained by controlling the fundamental correction waveforms.

The horizontal and vertical synchronization signals are supplied to the correction waveform generating circuit 25 through input terminals 23 and 24. The correction waveform generating circuit 25 generates 12 kinds of fundamental correction waveforms (WF1–WF12) minimally required for convergence corrections, as is shown in FIG. 20.

The correction waveform generating circuit 25 includes, for example, a plurality of Miller integration circuits, and generates the fundamental correction waveforms synchronized to the input synchronization signals. The fundamental correction waveforms from the correction waveform generating circuit 25 are supplied to the reference voltage terminals of multiplier-type D/A converters 28 to 39.

Correction data are stored in an EEPROM 26, and supplied via the CPU 17 to a serial data producing circuit 27.

The serial data producing circuit 27 produces a serial signal in accordance with a control signal from the CPU 17.

The serial signal output from the serial data producing circuit 27 is shown in FIGS. 21A to 21C. As shown in FIG. 21A, an address signal (A3–A0) and a data signal (D7–D0) are multiplexed on the serial signal. The address signal is used to select one of the multiplier-type D/A converters 28 to 39 and the data signal is used to control the amplitude. FIGS. 21B and 21C show a clock signal and a load signal, respectively, for reading the serial data shown in FIG. 21A by clocking.

The multiplier-type D/A converters 28 to 39 are set so that each data bit is loaded at each positive-going transition of the clock signal of FIG. 21B during the low period of the load signal of FIG. 21C.

The three serial signals shown in FIGS. 21A to 21C are supplied to the input terminals of the multiplier-type D/A converters 28 to 39. The multipli- er-type D/A converters 28 to 39 control the polarity and amplitude of the 12 kinds of fundamental correction waveforms (WF1–WF12) output from the correction waveform generating circuit 25.

The amplitude-controlled signals from the multiplier-type D/A converters 28 to 39 are supplied to an inverting amplifier 40 including an operational amplifier through their associated resistors.

The inverting amplifier 40 sums and amplifies the 12 kinds of correction waveforms, and outputs at an output terminal 41 a convergence correction signal for red color (R) in the horizontal direction (H), for example. The correction convergence signal is supplied to the convergence/geometric corrector 8 shown in FIG. 3, which applies the intended correction.

FIG. 22 shows relationships between analog correction signal waveforms and correction changes on the display screen.

The present invention is also effective for a digital convergence system wherein a plurality of adjustment points are set on the screen, correction data for each adjustment point is stored in a memory, and data interpolation is performed in the horizontal and vertical directions, thus creating a desired correction waveform, and achieving correction with high accuracy.

The same correction waveforms as described above are used for amplitude and deflection geometric distortion correction in the geometric distortion corrector 8, for brightness correction in the brightness corrector 7, and for focus correction in the focus corrector 11. Therefore, their description thereof will be herein omitted.

In the case where the geometric distortion correction is made based on an image signal obtained by imaging a test signal displayed on the display screen, the imaging device must be oriented properly with respect to the display screen. In other words, the imaging device and the display device should satisfy a certain positional relationship. Hereinafter, it is described how the positional relationship between the imaging device and the display device is adjusted and the reason why such an adjustment is needed.

Figure 23A:
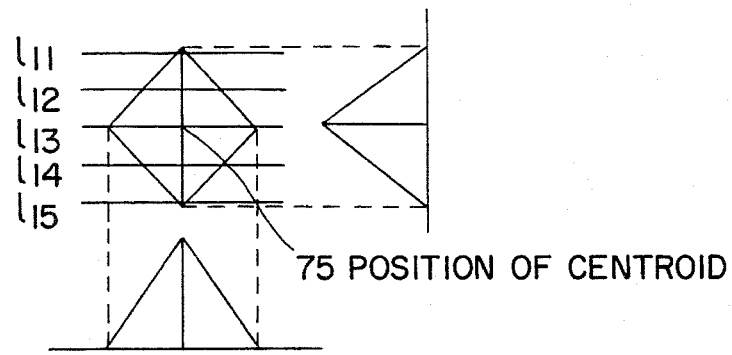

FIG. 23A shows an image signal in a case where the scanning direction of the imaging device 2 is aligned with the scanning direction of the display device 1. The image signal is obtained by imaging a test signal for the reference green color (G) signal displayed on the display screen 13 by the imaging device 2 including a CCD camera. $l_{11}$ to $l_{15}$ each indicate the scanning line of the imaging device 2.

FIG. 23B shows a waveform obtained by cutting the image signal shown in FIG. 23A along the scanning line $l_{11}$ and $l_{15}$. FIG. 23C shows a waveform obtained by cutting the image signal shown in FIG. 23A along the scanning line $l_{12}$ and $l_{14}$. FIG. 23D shows a waveform obtained by cutting the image signal shown in FIG. 23A along the scanning line $l_{13}$.

The position/level calculator 3 calculates a position of the centroid of the image signal and the rising and falling slopes of the image signal having a tetrahedron shaped waveform.

It is assumed that the angles of the rising slopes are $\theta_1$ and $\theta_3$, respectively, and the angles of the falling slopes are $\theta_2$ and $\theta_4$, respectively, as is shown in FIGS. 23C and 23D. In this case, the relationship of $\theta_1=\theta_2$ and $\theta_3=\theta_4$ is satisfied.

This means that the positional relationship between the imaging device 2 and the display device 1 can be measured by the angles of the rising and falling slopes of the image signal.

Figure 23E:
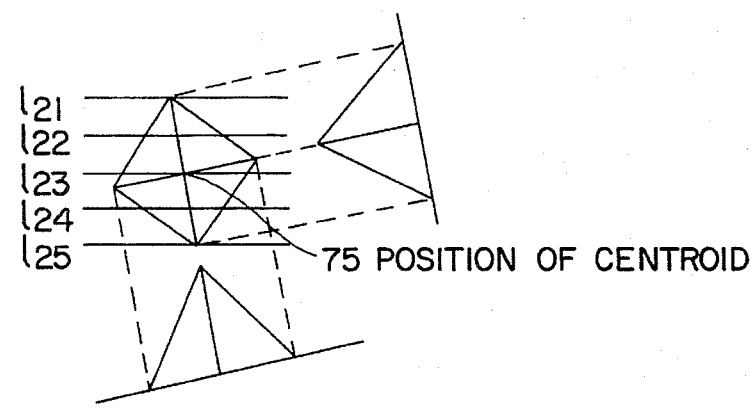

FIG. 23E shows an image signal in a case where the scanning direction of the imaging device 2 is not aligned with the scanning direction of the display device 1. $l_{21}$ to $l_{25}$ each indicates the scanning line of the imaging device 2.

FIG. 23F shows a waveform obtained by cutting the image signal shown in FIG. 23E along the scanning line $l_{21}$. FIG. 23G shows a waveform obtained by cutting the image signal shown in FIG. 23E along the scanning line $l_{22}$. FIG. 23H shows a waveform obtained by cutting the image signal shown in FIG. 23E along the scanning line $l_{23}$. FIG. 23I shows a waveform obtained by cutting the image signal shown in FIG. 23E along the scanning line $l_{24}$. FIG. 23J shows a waveform obtained by cutting the image signal shown in FIG. 23E along the scanning line $l_{25}$.

The position/level calculator 3 calculates rising and falling slopes of the image signal having a tetrahedron shaped waveform in the same manner described above.

In this case, the relationship of $\theta_5 \neq \theta_6$ and $\theta_9 \neq \theta_{10}$ is satisfied with respect to the angles of the rising and falling slopes, as is shown in FIGS. 23G, 23H and 23I.

As described above, by calculating the rising and falling slopes of the image signal having a tetrahedron shaped waveform along each scanning line and by comparing the rising slopes with the falling slopes, the relative positional relationship between the scanning direction of the imaging device and that of the display device can be found. In addition, by performing mathematical operations based on information indicating the relative positional relationship, geometric distortion and convergence corrections can be accomplished with high accuracy irrespective of the relative positional relationship between the imaging device and the display device.

Hereinafter, it is described how the mathematical operations are performed based on information indicating the relative positional relationship between the imaging device and the display device.

Figure 24A:
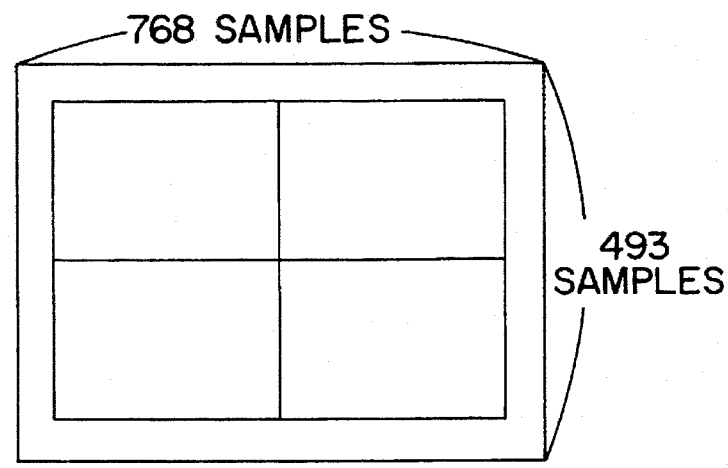
FIGS. 24A to 24C are views showing display screens for explaining the operation for calculating the positional relationship between the display and imaging devices.
Figure 24B:
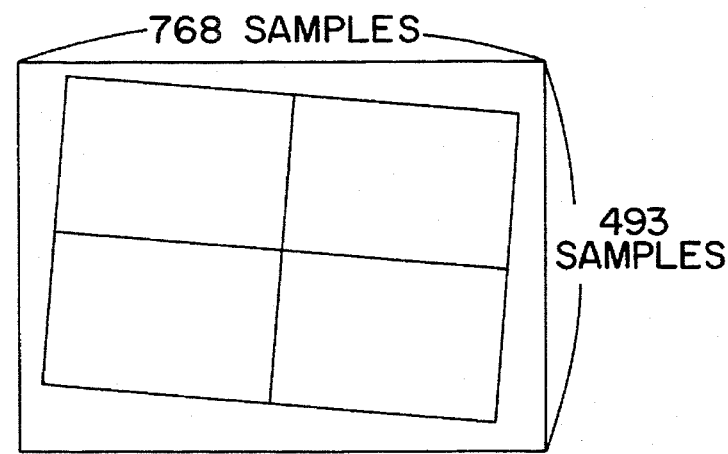

FIG. 24A shows an address map in the frame memory 16 in a case where the scanning direction of the CCD camera 14 is aligned with the scanning direction of the display device 1. FIG. 24B shows an address map in the frame memory 16 in a case where the scanning direction of the CCD camera 14 is not aligned with the scanning direction of the display device 1 (the CCD camera 14 is rotated to the right).

If the address map shown in FIG. 24B were used as the reference signal for geometric distortion correction, the imaging conditions of the imaging devise would also be subjected to correction, and therefore, the geometric distortion correction would be applied in the opposite direction.

Figure 24C:
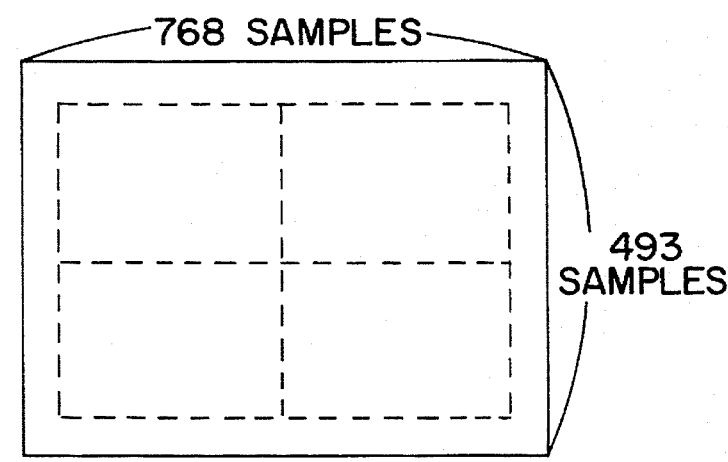

In order to avoid such a problem, the CPU 17 detects angles of the rising and falling slope of linear portions in the image signal so as to detect the relative positional relationship between the imaging device 2 and the display device 1, as is mentioned above. In addition, CPU 17 converts the uncorrected address map shown in FIG. 24B into an address map shown in FIG. 24C based on the detected angles of the rising and falling slopes. Thus, geometric distortion and convergence corrections can be accomplished with high accuracy irrespective of the relative positional relationship between the imaging device 2 and the display device 1.

Next, the relationship between the angles of slopes of the image signal and the scanning direction of the imaging device 2 will be described with reference to FIGS. 25A to 25G.

FIG. 25A shows an image obtained by the imaging device 2 including the CCD camera 14 in a case where the scanning direction of the CCD camera 14 is aligned with the scanning direction of the display device 1. FIG. 25B shows an image in a case where the CCD camera 14 is rotated to the right. FIG. 25C shows an image in a case where the CCD camera 14 is displaced to the left with respect to the display screen 13.

It is assumed that the angle of the rising slope of the image signal along the scanning direction is denoted by $\theta_a$ and the angle of the falling slope of the image signal along the scanning direction is denoted by $\theta_d$, as is shown in FIG. 25D. Table 1 shows the positional relationship between imaging device 2 and the display device 1 relative to the slope angles $\theta_a$ and $\theta_d$.

TABLE 1

| Slope angle | Relationship | Waveform |
| --- | --- | --- |
| $\theta_a = \theta_d$ | Alignment | FIG. 25D solid line |
| $\theta_a < \theta_d$ | Right rotation | FIG. 25D dashed line |
| $\theta_a > \theta_d$ | Left rotation | FIG. 25D broken line |

When $\theta_a = \theta_d$ (indicated by the solid line in FIG. 25D, the CPU 17 judges that the imaging device 2 is aligned with the display device 1.

When $\theta_a < \theta_d$ (indicated by the dashed line in FIG. 25D, the CPU 17 judges that the imaging device 2 is rotated to the right. When $\theta_a > \theta_d$ (indicated by broken line in FIG. 25D, the CPU 17 judges that the imaging device 2 is displaced to the left.

It is preferable that the slope angles of the image signal are detected at least nine points, as is shown in FIG. 25A. These nine points are positioned at a horizontal center line, a vertical center line, or in peripheral corners of the display screen. This arrangement of the points for detecting the slop angles makes it possible to calculate a complex positional relationship between the imaging device 2 and the display device 1.

Further, it is preferable that a rough adjustment is made based on the relative positional relationship with reference to the slope angles in a first step, and then a fine adjustment is made by calculating a position of the centroid in a second step. This is because it takes time to calculate a position of the centroid when the rough adjustment is not made.

Next, the relationship between lens f-value of the CCD camera and the slope angles of the image signal will be described with reference to FIG. 25G.

In a case where a ⅔-inch CCD camera is used, the relationship between lens f-value (f), viewing distance (L) and screen height (H) (object) is expressed by the following equation.

$$f = (9 \times L)/H$$

This means that when the viewing distance is about 3 H, an f-value of 20 mm is required. As a result, angular field distortion is likely to occur when a wide-angle lens (whose f-value is small) is used.

A zoom lens (f-value=15 to 80 mm) is usually used since geometric distortion in the imaging device can be reduced by making the viewing distance as large as possible.

When such a zoom lens is used, distortion due to the complex positional relationship between the display device and the imaging device such as shown in FIG. 25C seldom occurs. However, there may occur the situation shown in FIG. 25B when the scanning direction of the imaging device is not aligned with the scanning direction of the display device due to rotational displacement.

According to the present invention, test signals whose maximum values appear in the same direction as the scanning direction are displayed on the display screen, and rotational displacement of the imaging device is detected and calculated based on the slope angles of the photoelectric converted signal.

FIG. 25E shows an image signal in a case where the imaging device 2 is rotated to the right with respect to the display device 1, as is shown in FIG. 25B. In this case, the image signal has three crests as shown in FIG. 25E.

By mechanically controlling the rotating direction of the camera based on information indicating the slope angles of the image signal, the displaced crests of the image signal can be converged into a single crest, thereby achieving alignment of the imaging device 2 with the display device 1.

In FIGS. 25A to 25G, signals along the scanning lines in the vertical direction have been explained, but it will be noted that signals in the horizontal direction can be explained in the same way. However, it is noted that with signals in the vertical direction, detection and correction can be achieved with higher accuracy. This is because the signals in the vertical direction are sampled with the scanning lines while the signals in the horizontal direction are continuous signals.

In a case where the display screen is divided into more than one correction region and the correction is to be made to each of the regions, it will become necessary to determine the order in which the correction is made. Hereinafter, it is described how the order is determined with reference to FIGS. 26A to 26D, 27A to 27D and 28A to 28H.

With respect to geometric distortion and convergence corrections, there are two methods for determining the order of correction: One method includes making a correction in decreasing order of correction region size, the largest region first. The other method includes detecting the amount of error in each correction region and making a correction in decreasing order of the error size in each correction region, the largest error region first.

The method for determining the order of correction based on correction region size will be described with reference to FIGS. 27A to 27D.

Figure 27A:
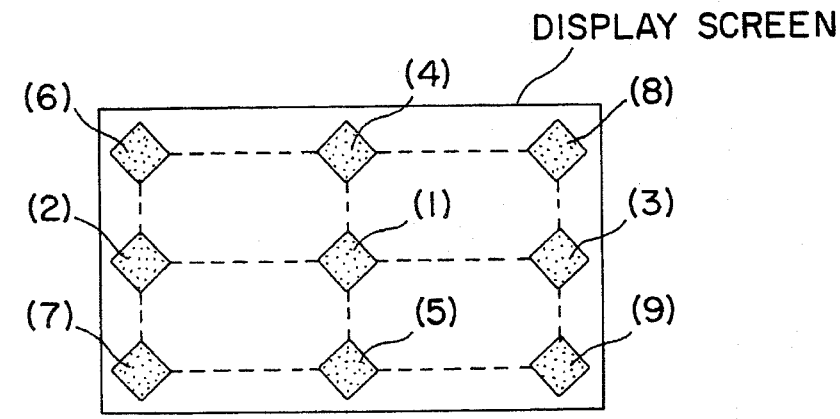
FIGS. 27A to 27D are views showing display screens for explaining a correction operation.
Figure 27B:
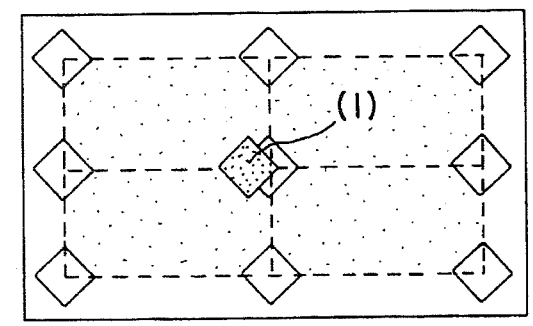
Figure 27C:
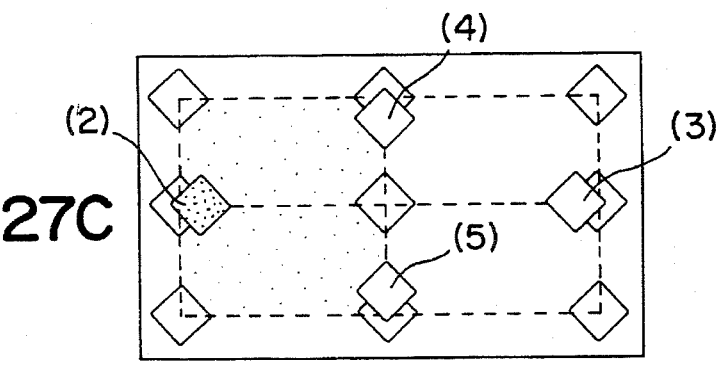
Figure 27D:
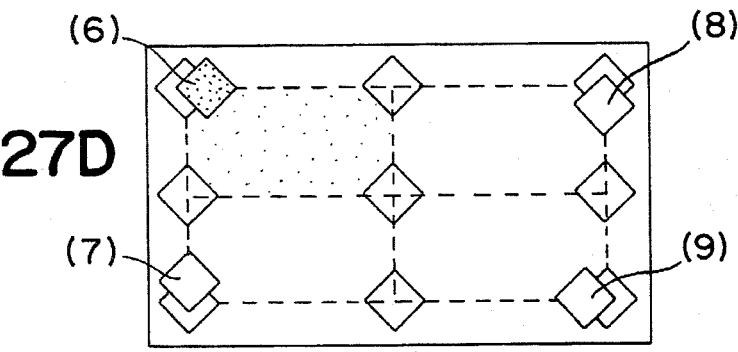

It is assumed that the following nine regions on the display screen are selected as the correction regions: (1) entire screen (static), (2) left portion of the screen, (3) right portion of the screen, (4) upper portion of the screen, (5) lower portion of the screen, (6) upper left portion of the screen, (7) lower left portion of the screen, (8) upper right portion of the screen, and (9) lower right portion of the screen. In this case, the corresponding nine adjustment patterns (1) to (9) shown in FIG. 27A are required.

Figure 26A:
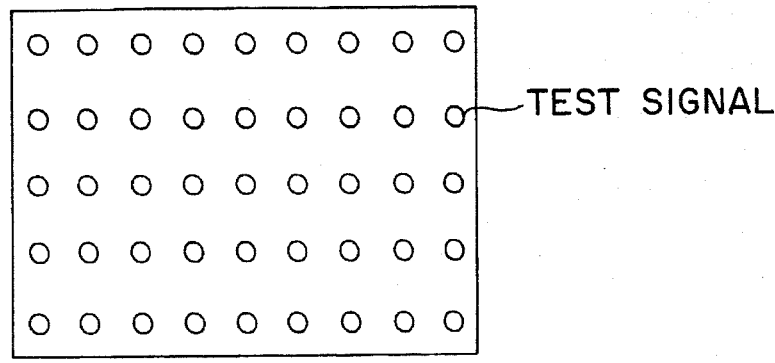
FIGS. 26A to 26D are views showing test signals on the display screen.
Figure 26B:
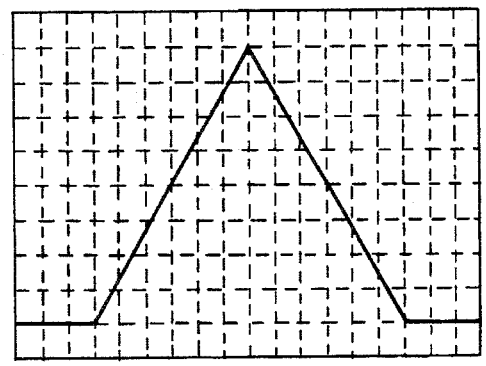
Figure 26C:
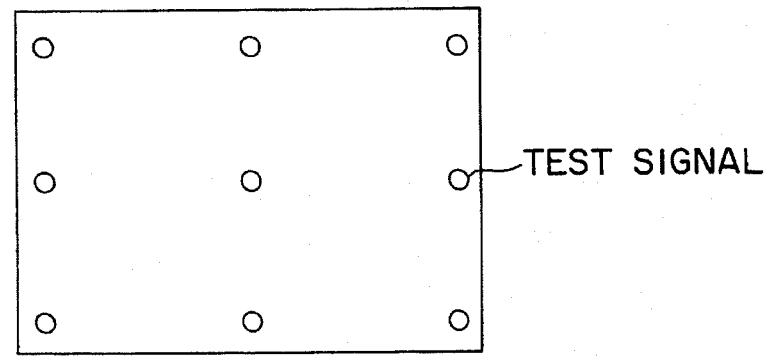
Figure 26D:
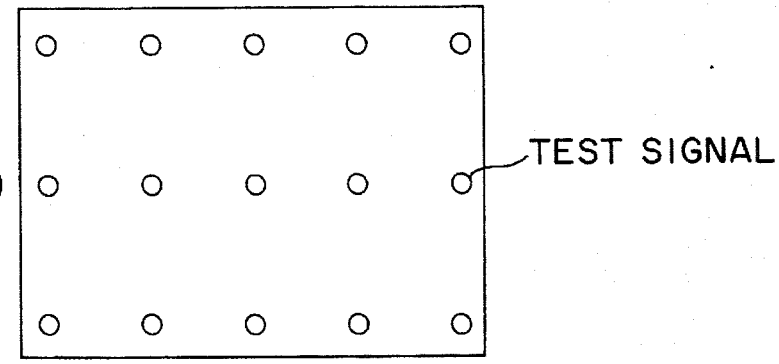

The explanation given below is based on this adjustment pattern. It will be understood that the same explanation applies when the number of correction regions is increased, for example, as shown in FIGS. 26A and 26D.

When the correction regions are selected mentioned above, the correction is made in decreasing order of correction region size: (1) entire screen (static) (shown in FIG. 27B); (2) left portion of the screen, (3) right portion of the screen, (4) upper portion of the screen, (5) lower portion of the screen ((2) to (5) shown in FIG. 27C); (6) upper left portion of the screen, (7) lower left portion of the screen, (8) upper right portion of the screen, and (9) lower right portion of the screen ((6) to (9) shown in FIG. 27D). No priority of order is given within (2) to (5) and within (6) to (9).

The reason why the correction is made in decreasing order of correction region size is as follows.

When correcting (1) entire screen and (2) left portion of the screen in the horizontal direction, for example, the correction waveform for correcting the entire screen is a DC waveform, whereas the correction waveform for correcting the left portion of the screen in the horizontal direction is an H-rate sawtooth waveform. If the order of correction is reversed and correction is made first to (2) left portion of the screen and then to (1) entire screen, positional displacement will occur to the first-adjusted left portion of the screen (2) during the correction of the entire screen (1), and readjustment will have to be made.

As described above, by making a correction in decreasing order of correction region size considering the correlations between the correction waveforms, correction can be made efficiently, and the time needed for adjustment can be reduced.

Next, the method of determining the order of correction based on the error size will be described with reference to FIGS. 28A to 28H.

Figure 28A:
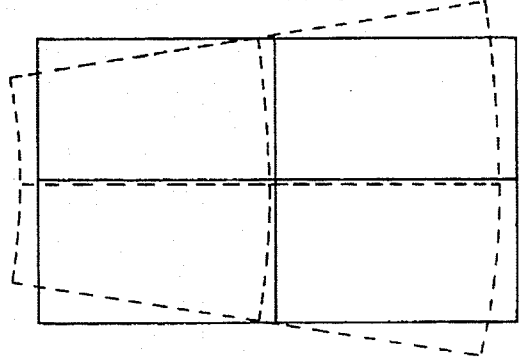
FIGS. 28A to 28H are views showing display screens for explaining a correction operation.

FIG. 28A shows a display screen misadjusted for convergence, wherein the reference G signal is indicated by a solid line and the R signal to be corrected for convergence is indicated by a broken line.

Figure 28E:
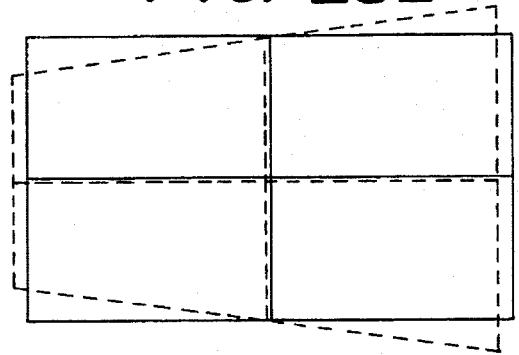
Figure 28B:
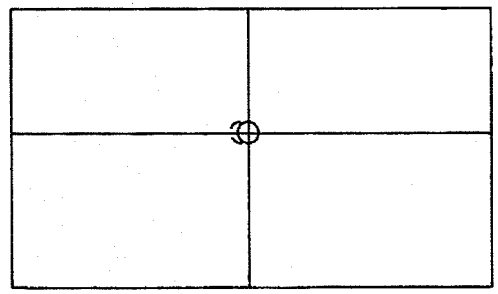

First, a test signal is displayed in the center of the screen, as shown in FIG. 28B, an error value of the test signal is calculated, and a static convergence correction is made based on the error value. FIG. 28C shows a display screen after the static convergence correction is completed. As can be seen from FIG. 28C, color separation in the center portion of the display screen is eliminated, and errors in the peripheral portions are reduced.

Figure 28F:
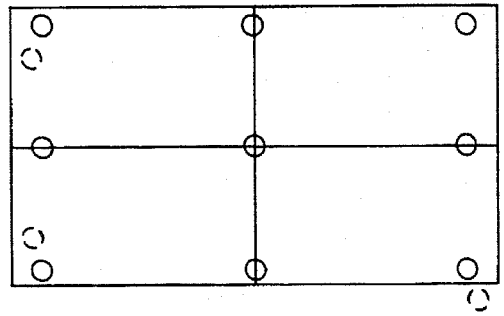
Figure 28C:
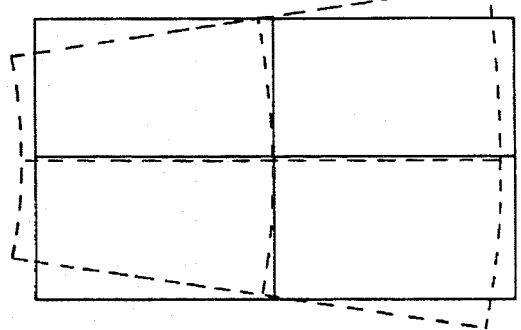
Figure 28G:
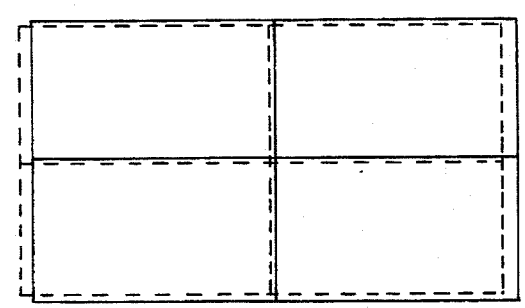
Figure 28D:
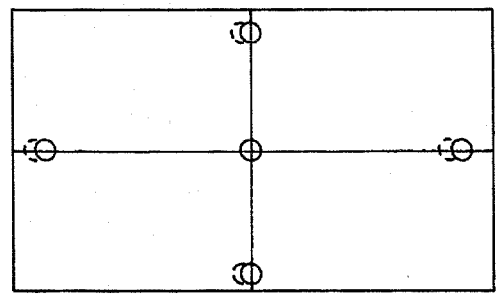

Second, test signals are displayed on the horizontal center line and the vertical center line of the display screen, as shown in FIG. 28D, error values of the test signals are calculated, and a dynamic convergence correction is made based on the error values. In this example, it is necessary to use a waveform for the vertical curve correction shown in FIG. 22. The vertical curve correction is achieved by applying a vertical parabola waveform to a vertical convergence yoke for the red color (R). FIG. 28E shows a display screen after the dynamic convergence correction is completed. As can be seen from FIG. 28E, the separation of colors along the horizontal and vertical center lines is eliminated.

Figure 28H:
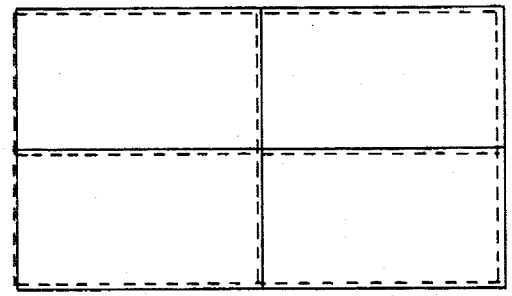

Third, test signals are displayed on peripheral portions (four corners) of the display screen, as shown in FIG. 28F, error values of the test signals are calculated, and a dynamic convergence correction is made based on the error values. In this example, it is necessary to use waveforms for the horizontal linearity and the left/right trapezium corrections. These corrections are made in decreasing order of error value. The left/right trapezium correction is achieved by applying a trapezium correction waveform obtained by multiplying a horizontal sawtooth waveform and a vertical sawtooth waveform (Hs×Vs) to a vertical convergence yoke for the red color (R). FIG. 28G shows a display screen after the left/right trapezium correction is completed. As can be seen from FIG. 28G, the trapezium distortion in the right and left portions of the display screen is eliminated. The horizontal linearity correction is achieved by applying a horizontal parabola waveform to a horizontal convergence yoke for the red color (R). FIG. 28H shows a display screen after the horizontal linearity correction is completed. As can be seen from FIG. 28H, the separation of colors in the center and peripheral portions of the display screen is eliminated, thereby achieving the intended correction.

As described above, the position of the centroid is detected based on the image signal obtained by imaging the test signal displayed on the display device, and error values of the image signal are calculated for respective colors, correction signals for adjustment are generated in decreasing order of the size of the error values and the size of the correction regions. This makes it possible to realize an automatic adjustment with high accuracy and to drastically reduce the time required for the adjustment.

Hereinafter, brightness adjustment ( white balance adjustment) will be described with reference to FIG. 3, FIGS. 29A to 29E and FIG. 33.

Figure 29A:
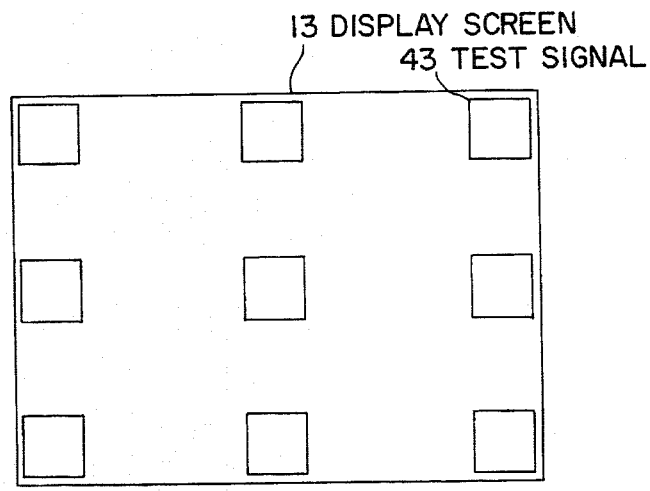
FIGS. 29A to 29E are views showing test signals for white balance correction.

The brightness adjustment is performed in a similar manner to the convergence and geometric distortion adjustments. Specifically, the test signal generator 5 generates a test signal for brightness adjustment. The test signal is supplied to the brightness corrector 7, and then is displayed on the display screen 13. FIG. 29A shows an example of test signals 43 displayed on the display screen 13 for the corresponding adjustment regions.

FIGS. 29B to 29E each shows an enlarged view of the test signal 43 shown in FIG. 29A.

Figure 29B:
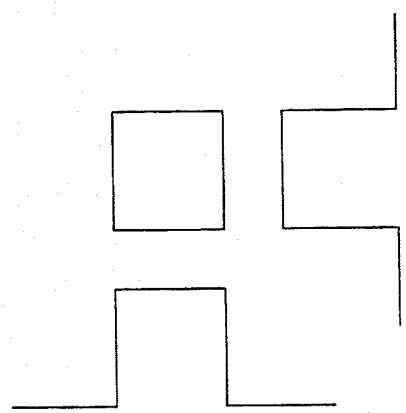
Figure 33:
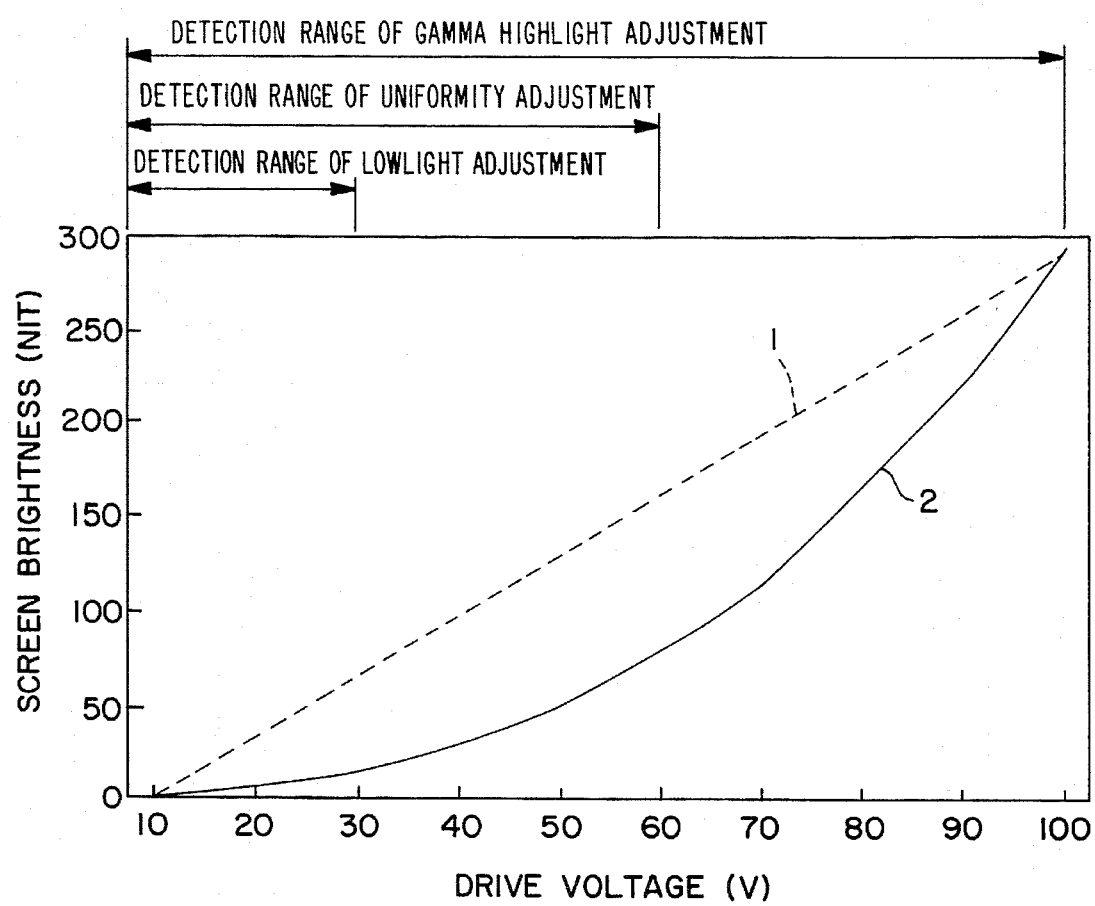
FIG. 33 is a view showing a waveform for white balance correction.

The test signal shown in FIG. 29B is used for highlight adjustment (white balance adjustment in high brightness portions), lowlight adjustment (white balance adjustment in low brightness portions) and uniformity correction (for uniform white balance over the entire screen). The test signal shown in FIG. 29B has a level of 10 to 20% for lowlight adjustment, a level of 100% for highlight adjustment, and a level of 50 to 60% for uniformity correction with respect to the dynamic range of the drive voltage, as is shown in FIG. 33.

Figure 29C:
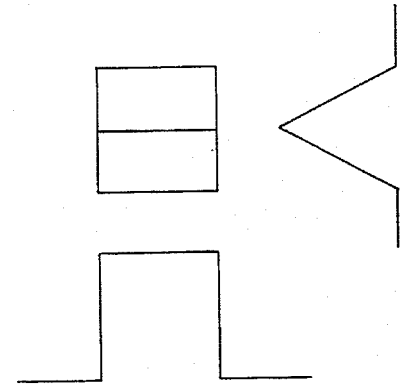
Figure 29D:
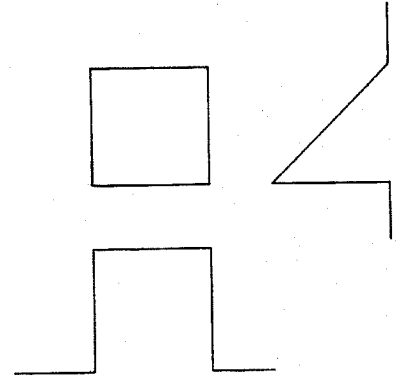
Figure 29E:
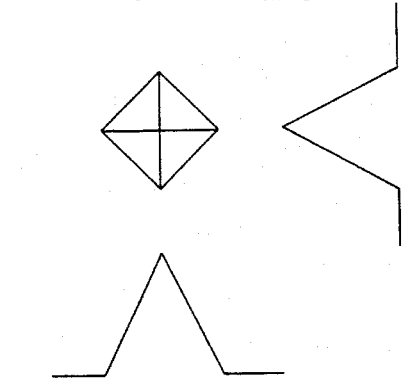

The test signal shown in FIGS. 29C to 29E is used for gamma correction. For the gamma correction, it is preferable that the test signal has a tetrahedron shaped waveform which is described above in connection with the centroid calculation, as is shown in FIG. 29E, or a ramp shaped waveform which has at least one of a rising linear portion and a falling linear portion in at least one of the horizontal direction and the vertical direction, as is shown in FIGS. 29C and 29D, so as to minimize the effect of the transfer characteristics of the display and imaging devices.

Hereinafter, the process of automatic brightness correction will be described.

The CCD camera 14 images a test signal displayed on the display screen 13. In the case where the CCD camera 14 is a black-and-white camera, the CCD camera 14 images each of the test signals for R, G and B colors and outputs the corresponding photoelectric converted signals sequentially.

The photoelectric converted signal for each R, G and B color output from the CCD camera 14 is supplied to the A/D 15 where the test signal information displayed on the display screen 13 shown in FIG. 29A is converted into a digital signal. The digital signal is used for subsequent image processing.

The digital signal output from the A/D 15 is stored in the frame memory 16 as display information.

The CPU 17 reads data stored in the frame memory 16 and then calculates error values, such as white balance errors, for each of the adjustment regions shown in FIG. 29A.

The resulting signal output from the CPU 17 is supplied to the correction signal generating circuit 18. The correction signal generating circuit 18 generates various correction signals based on the error values. The correction signals are supplied to the brightness corrector 7 in the display device 1. The brightness corrector automatically adjusts brightness for each of the correction regions.

Hereinafter, the process of the automatic brightness correction will be described in detail below with reference to FIG. 30.

Figure 30:
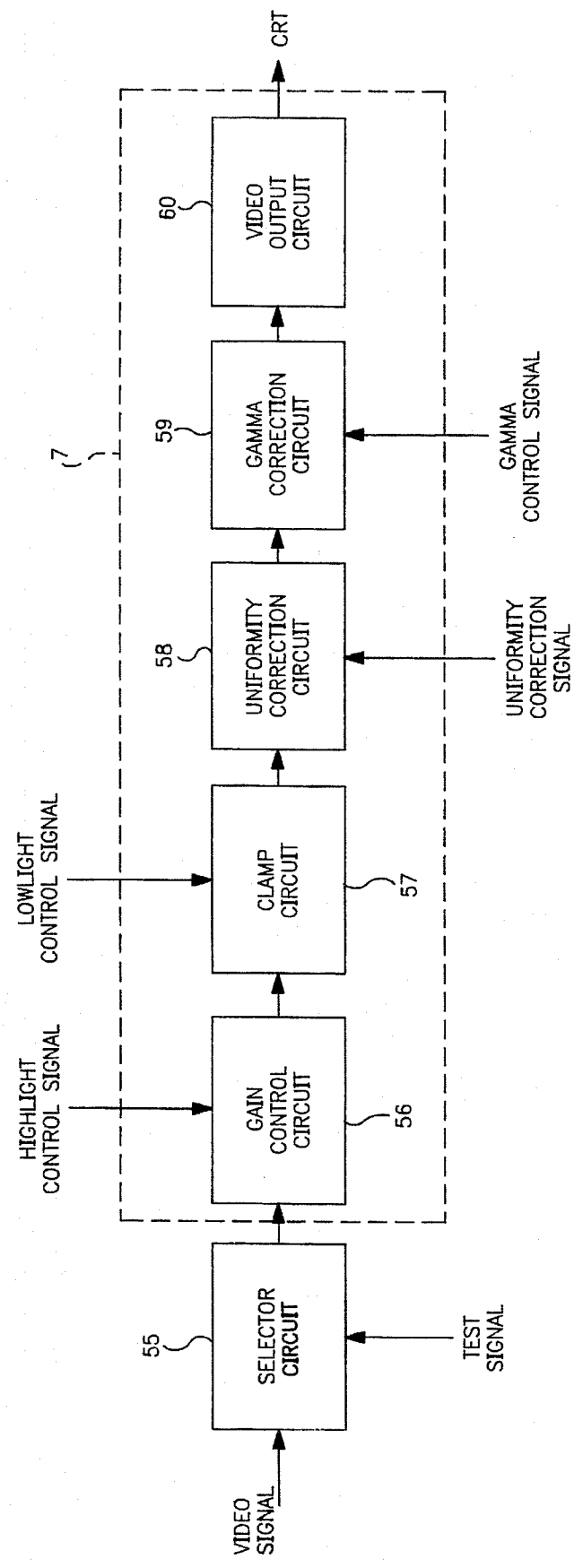
FIG. 30 is a block diagram showing a configuration of a brightness corrector.

FIG. 30 shows a configuration of the brightness corrector 7 shown in FIG. 3. The brightness corrector includes a selector circuit 55, a gain control circuit 56, a clamp circuit 57, a uniformity correction circuit 58, a gamma correction circuit 59 and a video output circuit 60.

The operation of the brightness corrector 7 is described below.

A video signal input to the input terminal and a test signal generated by the test signal generator 5 are suppled to the selector circuit 55. The selector circuit selectively outputs one of the video signal and the test signal. The signal output from the selector circuit 55 is supplied to the gain control circuit 56.

The gain control circuit 56 controls gain for contrast and highlight drive adjustments. The gain-controlled signal is supplied to the clamp circuit 57.

The clamp circuit 57 clamps the signal to a constant value and supplies it to the uniformity correction circuit 58.

The uniformity correction circuit 58 makes a correction for uniforming brightness in the center and peripheral portions of the display screen, and supplies the resulting signal to the gamma correction circuit 59.

The gamma correction circuit 59 corrects the change in light emitting characteristic of the R, G and B colors in the CRT, and supplies the resulting signal to the video output circuit 60.

The video output circuit 60 amplifies the corrected signal to a level sufficient to drive the CRT. Then, the amplified signal is applied to the CRT.

Table 2 shows the sequence order of brightness adjustments to be made. As shown in Table 2, lowlight adjustment is made at a first step, then highlight adjustment is made at a second step, gamma adjustment is made at a third step, and again highlight adjustment for correcting white balance errors caused in high brightness regions during the gamma adjustment is made at a fourth step, and uniformity adjustment for uniforming brightness over the entire display screen including center and peripheral portions is made at a final step.

TABLE 2

| Order | Adjustment item | Center portion of screen | Phriphral portion of screen | Test signal |
|---|---|---|---|---|
| 1 | Lowlight adjustment | O | — | Window signal (FIG. 29B) |
| 2 | Highlight adjustment | O | — | Window signal (FIG. 29B) |
| 3 | Gamma adjustment | O | — | Tetrahedron signal (FIG. 29E) |
| 4 | Highlight adjustment | O | — | Window signal (FIG. 29B) |
| 5 | Unformity adjustment | O | O | Window signal (FIG. 29B) |

Hereinafter, the lowlight and highlight adjustments will be described.

The test signal having an appropriate level for the selected adjustment mode, as shown in FIG. 33, is displayed on the display screen 13. The CCD camera 14 detects the level of the test signal for each R, G and B colors.

The photoelectric converted signals by the CCD camera 14 is supplied to the A/D 15, where the test signal information shown in FIG. 29B is converted into a digital signal. This digital data is then stored into the frame memory 16.

The lowlight and highlight adjustments can be made by the use of a test signal pattern only for the center region of the display screen. Accordingly, the CPU 17 reads data corresponding to the center portion of the display screen from the frame memory 16.

The CPU 17 calculates a white balance error and outputs a signal indicating the white balance error. The calculation of the white balance error is achieved by obtaining chromaticity coordinates based on the R, G and B signal levels, and comparing the obtained chromaticity coordinates with, for example, the reference white light coordinates (x=0.313, y=0.329). The difference in chromaticity coordinates from the reference is taken as a white balance error.

The signal indicating the white balance error output from the CPU 17 is supplied to the correction signal generating circuit 18.

When lowlight adjustment is selected, the correction signal generating circuit 18 supplies to the clamp circuit 57 a correction signal for controlling the cutoff of the R, G and B signals that drive the CRT. When the highlight adjustment is selected, the correction signal generating circuit 18 supplies a correction signal for controlling the amplitude of the R, G and B signals to the gain control circuit 56. These correction signals are determined so that the white balance error is eliminated. Thus, automatic correction of the white balance is accomplished.

Next, the gamma correction will be described below.

The gamma correction is classified into two types. One is to correct for the CRT gamma and the other is to correct for the gamma associated with the saturation of fluorescent material. Since the CRT gamma has already been described, we will describe gamma correction for the saturation of fluorescent material with reference to FIGS. 31 and 32.

Figure 31:
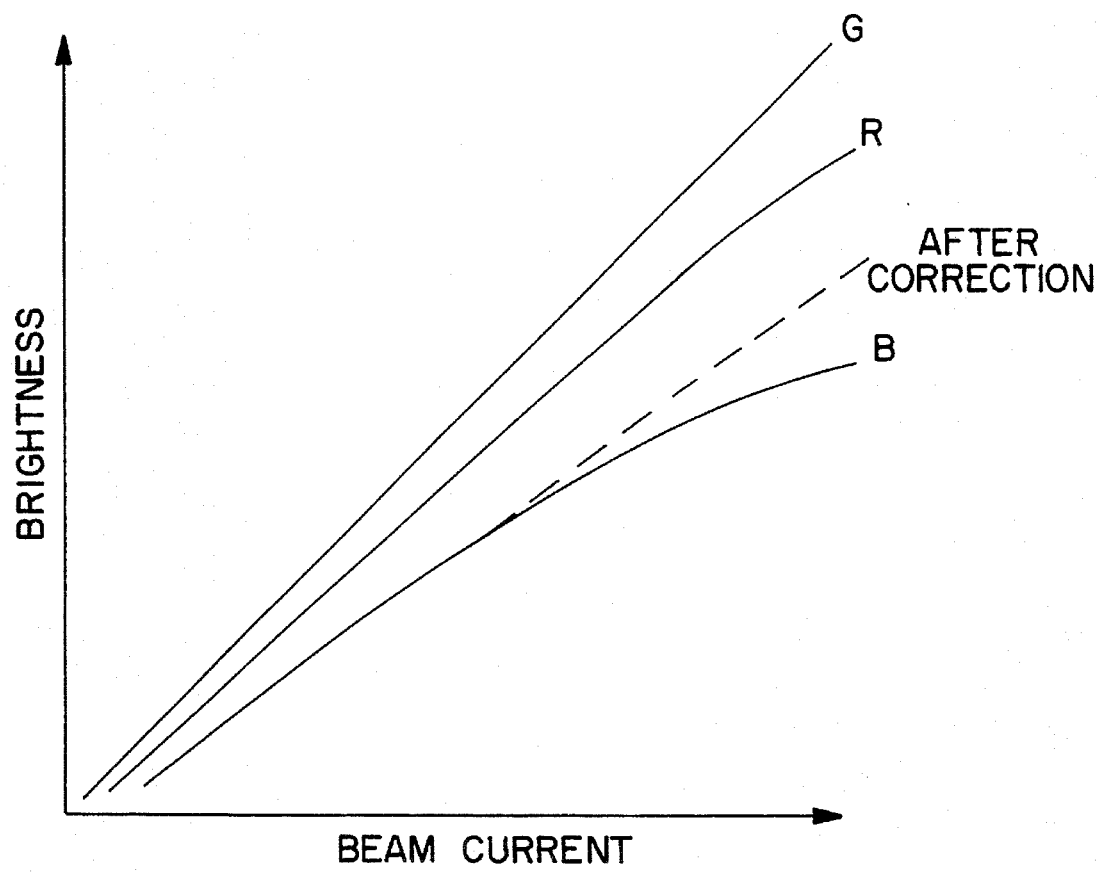
FIG. 31 is a characteristic diagram for gamma correction.

FIG. 31 shows typical light emitting characteristics for R, G and B in a large-screen video projector with a CRT including R, G and B tubes.

As can be seen from FIG. 31, the light emitting characteristics of G is linear throughout all regions, whereas the light emitting characteristic of B is nonlinear in the region above a certain level of the beam current. This nonlinear region is due to the saturation of the B fluorescent material in a large-current region.

Figure 32A:
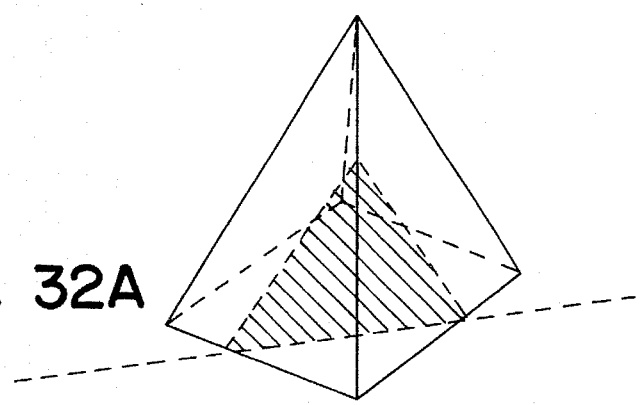
FIGS. 32A to 32G are views showing waveforms for explaining a gamma correction.
Figure 32B:
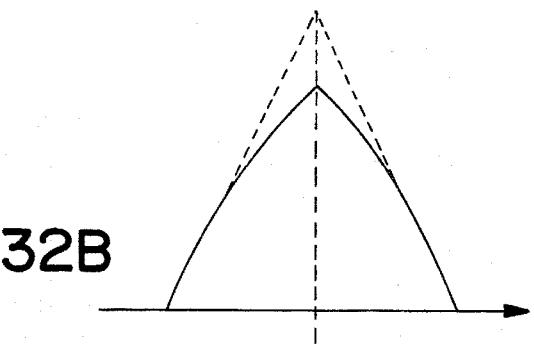

It is assumed that a test signal having a tetrahedron shaped waveform shown in FIG. 32A is displayed on the display screen. The imaging device 2 images the test signal so as to generate an image signal. In FIG. 32B, the solid line shows a cross section of the image signal which is cut along the scanning line. As is shown in FIG. 32B, the image signal is saturated in a high brightness region, due to the fluorescent material saturation characteristics shown in FIG. 31.

In order to correct the saturation characteristics, the CPU 17 calculates the difference between the image signal indicated by the solid line and a signal having a linear characteristics indicated by the broken line in FIG. 32B as an error value, and makes a gamma correction by controlling the gamma correction circuit 59 to eliminate the error value.

The calculation of the error value for the gamma correction will be described in detail below with reference to FIGS. 32C to 32F.

Figure 32C:
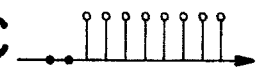
Figure 32D:
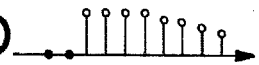

FIG. 32C shows a first difference of the signal having the linear characteristics indicated by the broken line in FIG. 32B. FIG. 32D shows a first difference of the image signal having the fluorescent material saturation characteristics indicated by the solid line in FIG. 32B.

Figure 32E:
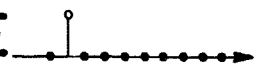
Figure 32F:
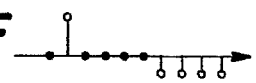
Figure 32G:
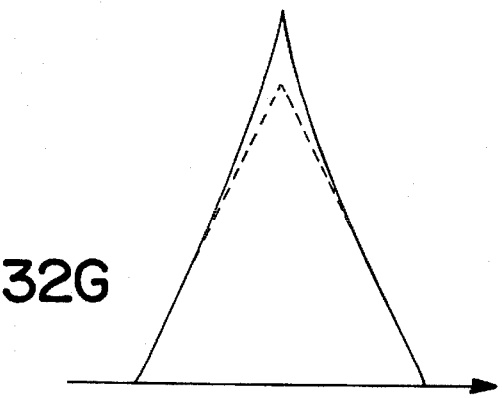

FIG. 32E shows a second difference of the above linear-characteristics signal, and FIG. 32F shows a second difference of the above saturation-characteristics signal.

In FIGS. 32C to 32F, the difference is taken only for the portion along one side leading to the crest of the signal of FIG. 32B. However, it will be recognized that the following discussion with reference to FIGS. 32C to 32F also holds even if the difference is taken over the entire region of the signal.

From comparison between FIGS. 32E and 32F, it can be seen that the sum of the absolute values of the second difference of the saturation-characteristics signal indicated by the solid line in FIG. 32B is greater than the sum of the absolute values of the second difference of the linear-characteristics signal indicated by the broken line in FIG. 32B.

The CPU 17 calculates the sum of the absolute values of the second difference derived from the saturation characteristics of the fluorescent material, as an error value of the gamma characteristics.

Further, the CPU 17 supplies the error value of the gamma characteristics to the gamma correction circuit 59. The gamma correction circuit 59 modulates the test signal waveform to be applied to the CRT, as is indicated by a solid line in FIG. 32G. As a result, the test signal displayed on the display screen is corrected to have linear characteristics over all signal levels, as is indicated by the broken line in FIG. 32G. This makes it possible to maintain consistent chromaticity over all of regions from the low to high brightness regions.

Next, the uniformity adjustment will be described below.

The objective of the uniformity adjustment is to correct an error in brightness balance between various portions of the display screen. Such an error is derived from the projection tubes and optics (lens and screen). Similar operations to those described above are performed, and a uniformity control signal is produced using the medium-level signal (50 to 60%) shown in FIG. 33.

The uniformity correction signal is supplied to the uniformity correction circuit 58. The uniformity correction circuit includes an analog modulator for multiplying the correction signal by the video signal so as to produce a modulated video signal. By controlling the amplitude of each of the R, G and B signals that drive the CRT, the uniformity adjustment for displaying a uniform image over the display screen is made automatically.

In detecting the level of the photoelectric converted signal for brightness adjustment, it will become necessary to dynamically vary the gain of the signal input to the A/D converter in accordance with the mode of brightness adjustment in consideration of the number of quantization bits of the A/D converter.

This will be explained using the operation control table shown in Table 3. Table 3 shows the signal gain at the preceding stage to the A/D converter and CRT gamma correction for each mode of brightness adjustment.

TABLE 3

| Adjustment item | A/D gain | Gamma coefficient |
|---|---|---|
| Lowlight adjustment | Large | ② Gamma correction No |
| Highlight adjustment | Small | ① Gamma correction Yes |
| Gamma adjustment | Small | ① Gamma correction Yes |
| Uniformity adjustment | Middle | ① Gamma correction Yes |

First, we will explain why CRT gamma correction needs to be introduced in order to perform optimum quantization over the entire gray scale range of the test signal as shown in FIG. 33.

In FIG. 33, the solid line shows the light emitting characteristics of the CRT. The CRT has a gamma coefficient of 2.2. By comparing the amount of brightness change in a lower drive voltage region with the amount of brightness change in a higher drive voltage region, it can be seen that the sensitivity increases rapidly in the higher drive voltage region.

This has a significant effect on the CPU, the frame memory, and the number of quantization bits of D/A and A/D convertors.

That is, in the lower drive voltage region, the amount of brightness change per bit is small, whereas in the higher drive voltage region, the amount of brightness change per bit becomes very large. As a result, the detection sensitivity over the entire gray scale range is varied. The variation of the detection sensitivity prevents detection and correction with high accuracy and requires 10 or more quantization bits.

Therefore, a correction is made so that the screen brightness is proportional to the drive voltage, as is indicated by a broken line in FIG. 33, thereby realizing consistent detection sensitivity and accuracy over the entire gray scale range and thus achieving level detection with high accuracy.

It is generally considered that the number of quantization bits required for white balance adjustment and gamma correction is 10 (1024 gray scales).

In the present invention, the gain at the preceding stage to A/D is controlled and the CRT gamma correction is made for each of the adjustment modes. This makes it possible to process with 8-bit quantization bits.

As shown in the operation control table of Table 2, for lowlight adjustment the gain at the preceding stage to A/D is increased so as to detect the range of the low brightness region (10 to 30 V), with a gamma correction coefficient indicated by a solid line (no gamma correction applied); for highlight and gamma adjustments, the gain at the preceding stage to A/D is reduced so as to detect the range of the low to high brightness regions (10 to 100 V), with a gamma correction coefficient indicated by a broken line (gamma correction applied); and for uniformity adjustment, the gain at the preceding stage to A/D is set to an intermediate level so as to detect the range of the medium brightness region (10 to 60 V), with a gamma correction coefficient indicated by a broken line (gamma correction applied). Level detection of high accuracy is thus achieved.

Thus, brightness corrections, such as white balance and uniformity, are automatically made.

Next, the focus adjustment will be described with reference to FIGS. 34A to 34D.

Figure 34A:
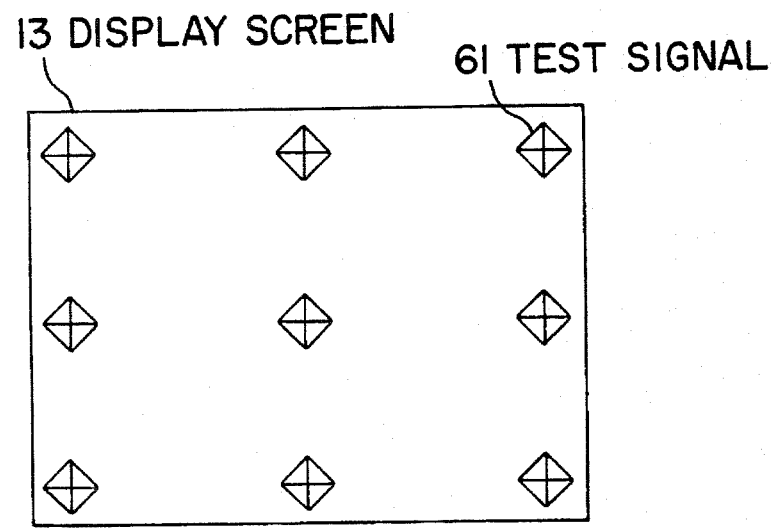
FIGS. 34A to 34D are views showing test signals for focus adjustment.

For automatic electrical focus adjustment, the test signal generator 5 generates a test signal 61 for the focus adjustment. The test signal 61 has, for example, a waveform having a cut shown in FIG. 34B. The test signal 61 is supplied to the brightness corrector 7, and is displayed on the display screen 13, as is shown in FIG. 34A. This is similar to the case of convergence adjustment mentioned above.

The imaging device 2 images the test signal 61 so as to generate an image signal. The image signal has, for example, waveforms shown in FIGS. 34C and 34D.

The image signal having a tetrahedron shaped waveform is supplied to the A/D 15. The A/D 15 converts the image signal into a digital signal.

The digital signal output from the A/D 15 is stored in the frame memory 16 as display information.

The CPU 17 reads data stored in the frame memory 16 for each of the adjustment regions and calculates a level and an error value of the image signal.

The resulting signal output from the CPU 17 is supplied to the correction signal generating circuit 18. The correction signal generating circuit 18 generates a correction signal for the focus adjustment. The correction signal is supplied to the focus corrector 11 in the display device 1.

Figure 34B:
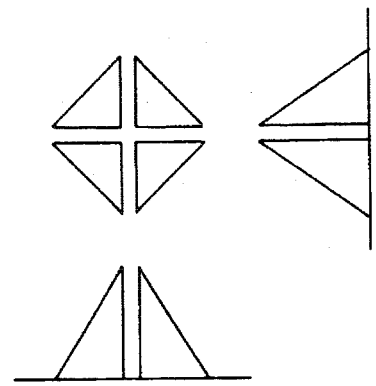
Figure 34C:
Figure 34D:

In detecting a level of the signal, the CPU 17 detects an image signal having a waveform, as is shown in FIGS. 34C and 34D, and calculates a correction waveform for producing a waveform, such as shown in FIG. 34D, that minimizes the cut level for each correction region.

By driving the focus corrector 11 with this correction data, a photoelectric converted signal with focus adjustment made for peripheral portions can be obtained by the CCD camera 14.

In this manner, the cut in the pattern signal for each adjustment point on the display screen is detected, and the amount of correction is calculated where the level is the smallest, i.e., the modulation transfer function (MTF) of the cut pulse component is the greatest.

In the above method, the best focus point is extracted by MTF. Alternatively, the high frequency component of the signal may be extracted to obtain the same result.

A cut pulse for focus adjustment is inserted near the crest of the test signal having a tetrahedron shaped waveform, as is shown in FIG. 34B. This is because the test signal near to the crest is free from effects of linear approximation calculations and the test signal is also available for calculating the position of the centroid detection for the convergence adjustment, etc.

Figure 35:
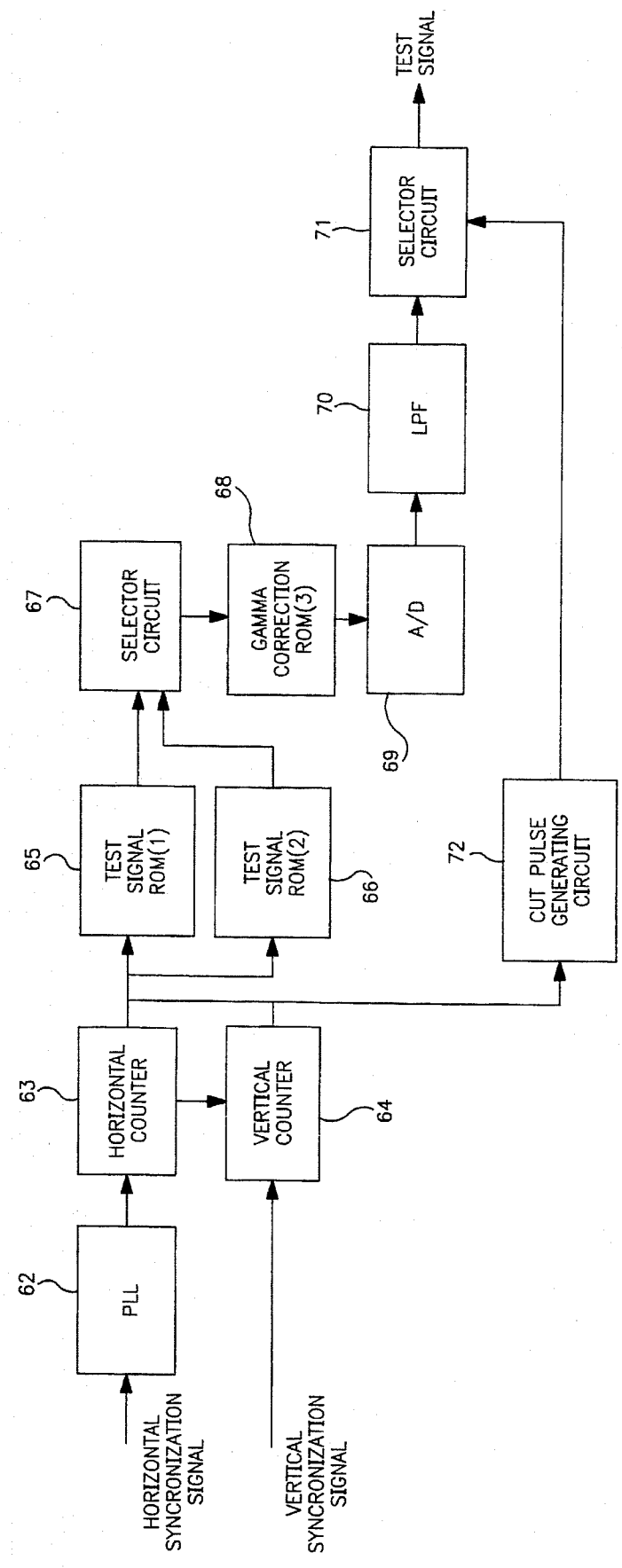
FIG. 35 is a block diagram showing a configuration of a first test signal generator.

Next, the method of generating test signals to be used for the above-described adjustments will be described in detail with reference to FIG. 35.

The horizontal synchronization signal is supplied to a phase-locked loop circuit (PLL) 62. The PLL 62 generates a reference clock signal synchronized to the horizontal synchronization signal, and supplies the reference clock signal to a horizontal counter 63. The horizontal counter 63 generates an address signal in the vertical direction.

The horizontal address signal output from the horizontal counter 63 and the vertical synchronization signal are supplied to a vertical counter 64. The vertical counter 64 generates an address signal in the vertical direction.

The address signals from the horizontal counter 63 and vertical counter 64 are supplied to a test signal ROM(1) 65 and also to a test signal ROM(2) 66.

The test signal ROM(1) 65 holds a test signal having a tetrahedron shaped waveform for convergence adjustments, such as shown in FIG. 29E, while the test signal ROM(2) 66 holds a test signal having a window-like shape for white balance adjustments, such as shown in FIG. 29B.

The test signal output from the test signal ROM(1) 65 and the test signal output from the test signal ROM(2) 66 are supplied to a selector circuit 67. The selector circuit 67 outputs the selected test signal according to the adjustment mode.

The signal output from the selector circuit 67 is supplied to a gamma correction ROM(3) 68. The gamma correction ROM(3) 68 makes a gamma correction for the CRT gamma of the display device.

In FIG. 33, a solid line indicates the CRT input drive voltage versus screen brightness characteristics. As shown in FIG. 33, the screen brightness is a function of the drive voltage raised to the approximately 2.2 power.

The digital signal from the gamma correction ROM(3) 68 is supplied to an A/D converter 69. The A/D converter 69 converts the digital signal into an analog signal.

The analog signal from the A/D converter 69 is supplied to a low-pass filter (LPF) 70. The LPF 70 smooths the analog signal in the horizontal direction, and supplies the resulting signal to a selector circuit 71.

The address signals from the horizontal counter 63 and vertical counter 64 are also supplied to a cut pulse generating circuit 72 which generates a cut pulse for focus adjustment.

The cut pulse from the cut pulse generating circuit 72 is supplied to the selector circuit 71. In the focus adjustment mode, the selector circuit 71 outputs a tetrahedron shaped test signal having a cut, such as shown in FIG. 34B.

Figure 36A:
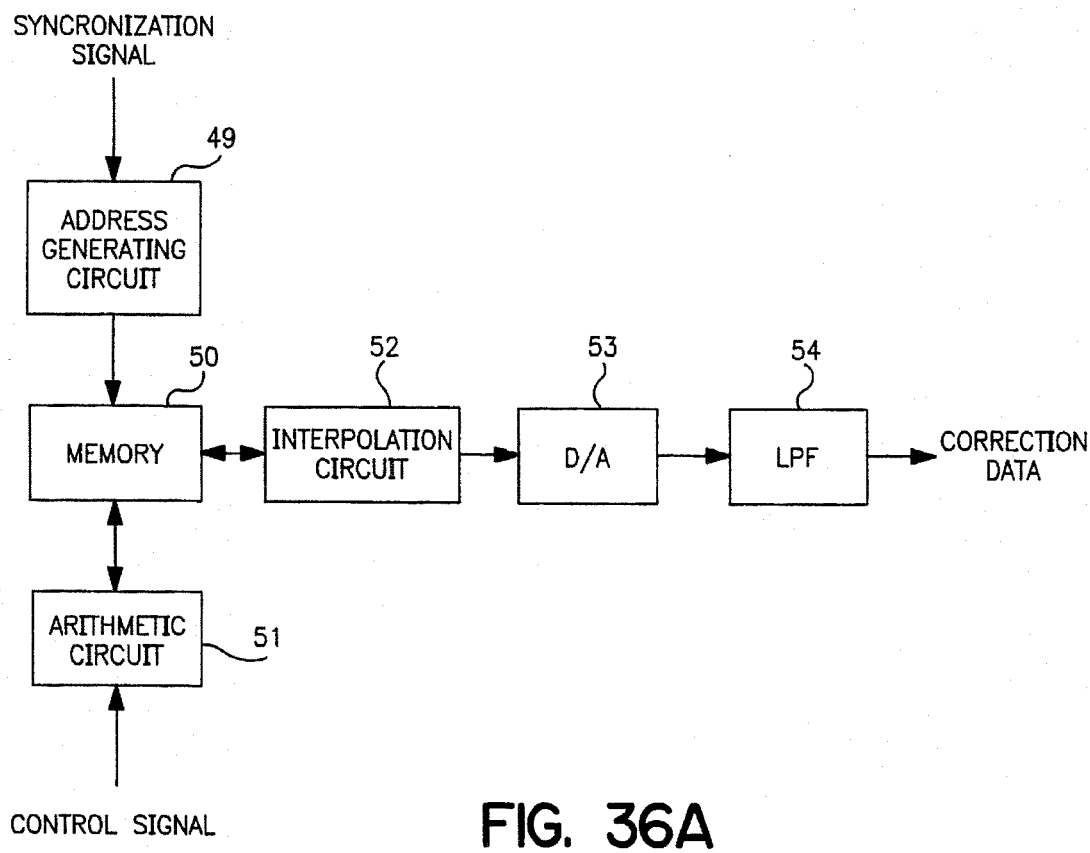
FIGS. 36A and 36B are diagrams showing a configuration and operation of a second test signal generator.
Figure 36B:
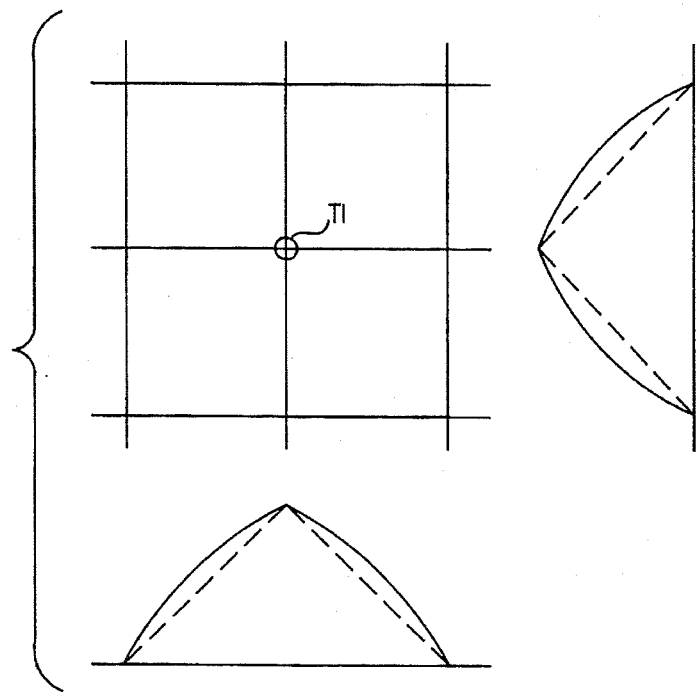

Referring to FIGS. 36A and 36B, a multiscan-compatible method of generating a test signal having a tetrahedron shape waveform will be described below.

Briefly, this method includes providing a plurality of test signal generation regions in the horizontal and vertical directions on the display screen, storing correction data for each generation region in a memory, and interpolating data in the horizontal and vertical directions, thereby displaying the same number of test signals regardless of the change in the scanning frequency.

FIG. 36A shows a configuration of the test signal generator 5. The test signal generator 5 includes an address generating circuit 49 for generating various address signals based on the synchronization signals; an arithmetic circuit 51 for calculating correction data based on a control signal; a memory 50 for storing data for each test signal region; an interpolation circuit 52 for interpolating data between correction points; a D/A converter 53 for converting the interpolated data into an analog amount; and a low-pass filter (LPF) 54 for smoothing the analog amount.

An approximation calculation in the interpolation circuit 52 will be outlined with reference to FIG. 36B. As shown in FIG. 36B, correction data is input to a test signal generation region T1, and with this region as the center, a curve approximation calculation corresponding to the previously described gamma correction is performed, thereby accomplishing data interpolation in the horizontal and vertical directions, as indicated by the solid lines. The resulting signal is supplied to the display device. When the signal displayed on the display screen is photoelectric converted, the signal having a tetrahedron shaped waveform indicated by the broken lines in FIG. 36B is obtained. In this manner, the same number of signals, with their curved slopes corrected to linear sections when photoelectric converted, can always be produced.

Thus, by generating test signals appropriate to the CRT gamma of the display device, the detection sensitivity and accuracy are maintained consistent over the entire gray scale range, thus achieving position and level detection with high accuracy while at the same time, simplifying the approximation calculation operation for the calculation of the centroid.

In the above embodiment, correction for the CRT gamma of the display device has been described as being made at the test signal generating side. However, it will be appreciated that gamma correction may be made anywhere within the loop including test signal generation, image display, imaging, and centroid detection.

Figure 37:
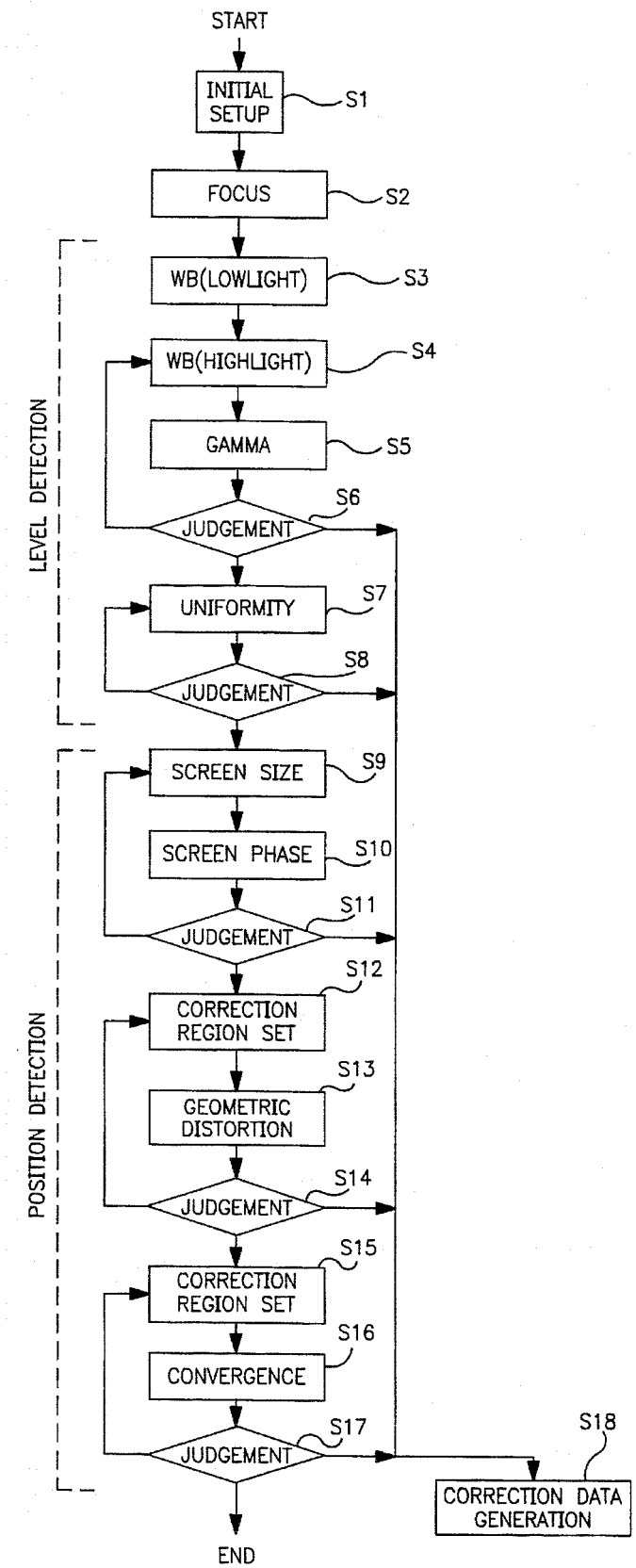
FIG. 37 is a flowchart showing the sequence of adjustments.
Figure 38:
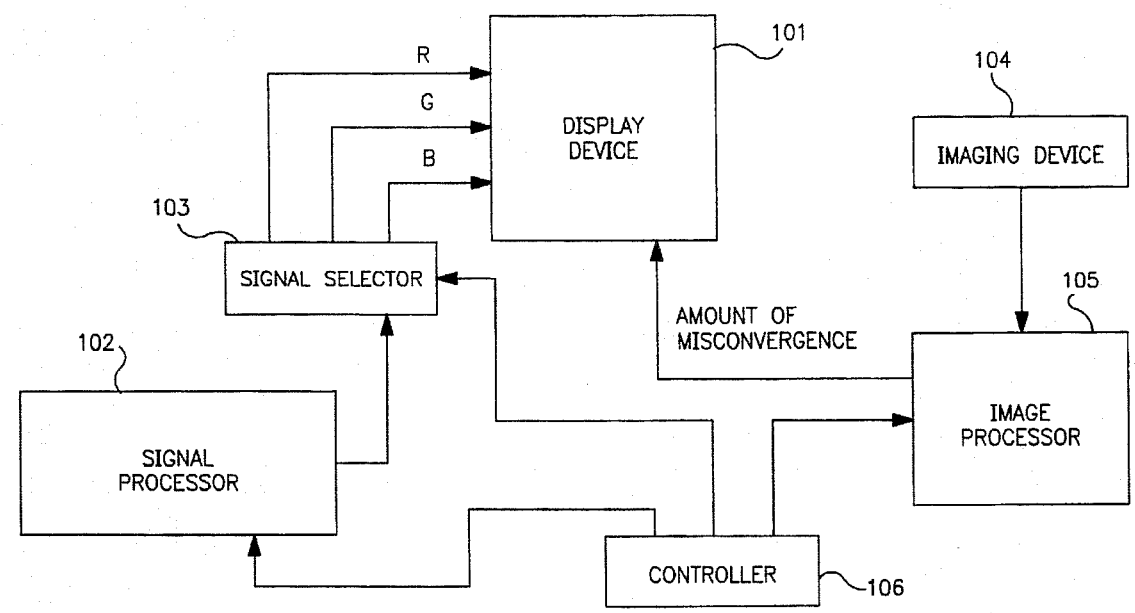
FIG. 38 is a block diagram showing the configuration of a prior art image correction apparatus.
Figure 39A:
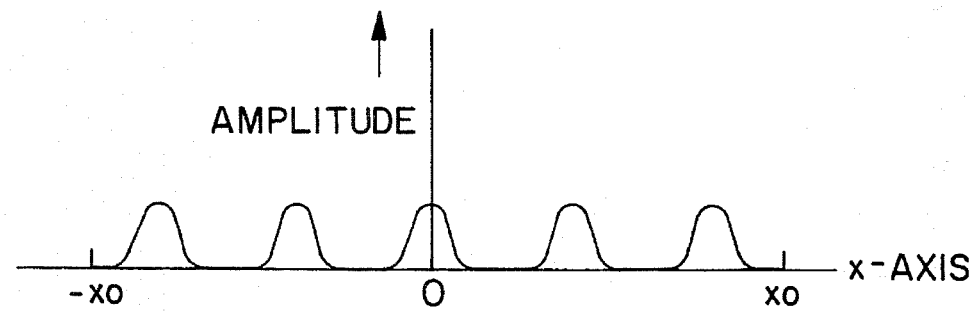
FIGS. 39A and 39B are views showing adjustment test signals for the prior art image correction apparatus.
Figure 39B:
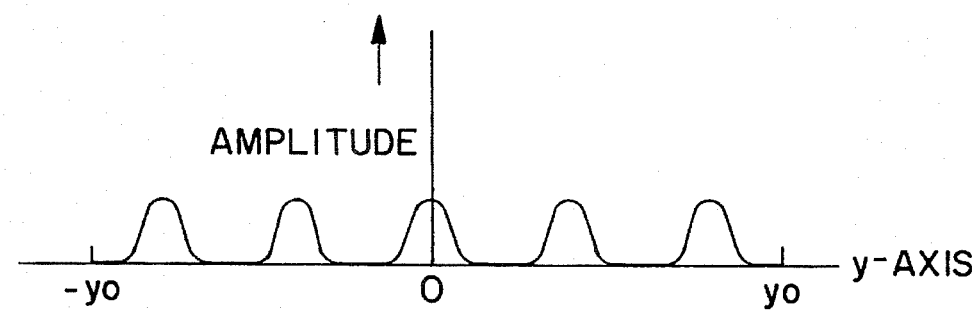
Figure 40:
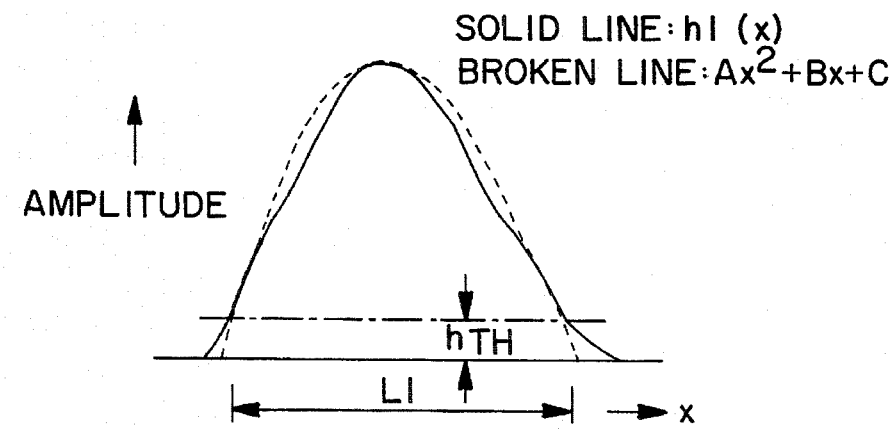
FIG. 40 is a view showing a waveform for explaining a centroid calculation operation in the prior art image correction apparatus.

Geometric distortion, convergence, white balance, and focus corrections have been described in detail. The relationships among these adjustments and the sequence of adjustments will be summarized below with reference to FIG. 37.

At step S1, initial setup is done for the display device to be corrected and the image correction apparatus.

At step S2, the focus correction is made. This is because the saturation characteristics of the B fluorescent material largely depends on the focus characteristics.

At steps S3 to S5, the white balance corrections, i.e. lowlight, highlight, and gamma corrections, are made for the center region of the display screen.

At step S7, the uniformity correction is made for the white balance correction over the entire display screen.

The steps from S3 to S8 are in a mode for level detection of the image information.

At steps S9 and S10, display region corrections are made with respect to the size and phase of the display screen on the display device.

At steps S12 and S13, the geometric distortion corrections are made for each of the correction regions.

At step S15 and S16, the convergence (separation of colors) corrections are made for each of the correction regions.

The steps from S9 to S17 are in a mode for position detection of the image information. When proper convergence is achieved, the correction procedure is completed.

The accuracy of centroid detection depends on the linearity of the test signal. In the above procedure, since geometric distortion and convergence corrections are made after gamma correction in the level detection process. Accordingly, the correction with high accuracy can be achieved.

As described above, a test signal having a tetrahedral-like shape is captured by the imaging device so as to generate an image signal, and the centroid and the level of the image signal are detected to calculate an error value for each color; using each calculated signal, correction waveforms are automatically generated for correction of convergence, geometric distortion, brightness, and focus, thus eliminating the need for various complex adjustment work procedures, and achieving a drastic reduction in the adjustment time.

The present invention has been described by taking a display device with a CRT as an example. However, it will be appreciated that the invention is also effective for other types of display devices.

In the description of the present invention, a CCD camera has been used as the imaging device for detecting image light. However, a two-dimensional or one-dimensional detection device may be used instead.

Furthermore, in the present invention, a signal communicating between the correction circuit and the image enlarging projection display device is a signal having a correction waveform for correcting the driving circuit in the display device. Alternatively, the signal may be a control signal for controlling directly the correction waveforms.

The above description of the present invention has dealt with a method of performing convergence corrections in analog form by splitting the screen. However, the invention is not limited to the illustrated method. Any other method capable of achieving convergence adjustments effectively may be employed.

In the above description of the present invention, a tetrahedron shaped photoelectric converted signal which varies substantially linearly in rising and falling portions is obtained by the imaging device, and the position of the centroid in the horizontal and vertical directions is calculated based on the signal for each region by the use of the linear approximation method. However, it will be appreciated that nonlinear approximation method may be used to calculate the position of the centroid if such approximation can be made in a simple way.

In the present invention, PLL has been used to control the phase of the clock signal. However, other control elements may be used instead. Furthermore, in the invention, sample points are varied by controlling the clock signal. However, this may be accomplished by controlling the phase of the input signal.

In the present invention, for gamma correction, a second difference signal has been used to calculate the linearity of the test signal pattern. However, differential signals of other orders may be used.

In the present invention, a tetrahedron shaped signal or a ramp signal in the vertical direction has been used as the test signal for gamma correction. Alternatively, a ramp signal in the horizontal direction or a staircase waveform varying in a steplike manner may be used as the test signal.

In the present invention, correction for the CRT gamma of the display device has been made at the test signal generating side. However, it will be appreciated that gamma correction may be made anywhere within the loop including test signal generation, image display, imaging, and centroid detection.

In the present invention, corrections have been made in the order of focus, white balance, geometric distortion, and convergence. However, the sequence order may be changed as necessary.

The description of the present invention has dealt with a two-piece construction in which the display device and the detection system are separate units. However, in the case of a one-piece construction such as a rear projection type video projector, it may be so configured as to detect the display screen from the rear side. In the case of a direct-view display, a detection device may be provided inside the CRT.

The present invention has been described by taking a single-screen display device. However, it will be appreciated that the invention is also applicable to a multi-screen display device consisting of a plurality of display screens.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for correcting images, comprising:

test signal generating means for generating a test signal;

display means for displaying said test signal in a region on a display screen;

imaging means for imaging said test signal displayed on said display screen in a scanning direction so as to produce an image signal having a rising linear portion and a falling portion along said scanning direction, said image signal having a tetrahedron shaped waveform, where said tetrahedron has a base plane which is parallel to said display screen and a height in a level direction of said image signal;

position calculating means for calculating a position of a centroid of said image signal for each of R, G and B colors, based on said rising linear portion and said falling linear portion;

error detecting means for detecting an amount of error between said calculated positions of said centroids for R, G and B colors;

correction signal generating means for generating a correction signal for correcting a convergence and a geometric distortion for said region, based on said amount of said error; and correcting means for correcting said convergence and said geometric distortion for said region, based on said correction signal.

2. An apparatus according to claim 1, wherein said position calculating means calculates said position of said centroid by applying a linear approximation.

3. An apparatus according to claim 1, wherein said position calculating means further calculates a relative positional relationship between said display means and said imaging means, based on a slope of said rising linear portion and a slope of said falling linear portion.

4. An apparatus according to claim 1, wherein said image signal is an analog signal, said position calculating means comprises:

clock signal generating means for generating a clock signal for sampling;

converting means for converting said analog image signal into a digital image signal having a plurality of discrete levels by the use of said clock signal;

calculating means for calculating said position of said centroid according to said digital image signal;

phase shifting means for shifting a phase of said clock signal under a condition that, when said digital image signal has a first discrete level at an edge of said clock signal, said digital image signal has a second discrete level which is different from said first discrete level at said corresponding edge of said phase-shifted clock signal.

5. An apparatus according to claim 1, wherein said display screen has at least one region having a size, and said correction signal generating means determines an order in which said correction signal is generated, based on said size of said region.

6. An apparatus according to claim 1, wherein said display screen has at least one region, said correction signal generating means determines an order in which said correction signal is generated, based on said amount of said error.

7. An apparatus for correcting images, comprising:

test signal generating means for generating a test signal;

display means for displaying said test signal on a display screen;

imaging means for imaging said test signal displayed on said display screen in a scanning direction so as to produce an image signal having at least one of a rising linear portion and a falling linear portion along said scanning direction;

level calculating means for calculating a level of at least one of said rising linear portion and said falling linear portion;

error detecting means for detecting an amount of error between said calculated level of said image signal and a level of a saturated signal due to saturation characteristics of fluorescent material;

correction signal generating means for generating a gamma correction signal for making a gamma correction, based on said amount of said error; and correcting means for making said gamma correction, based on said gamma correction signal.

8. An apparatus according to claim 7, wherein said error detecting means detects said amount of said error by the use of a differential signal of said image signal and a differential signal of said saturated signal.

9. An apparatus according to claim 7, wherein said image signal has a tetrahedron shaped waveform, where said tetrahedron has a base plane which is parallel to said display screen and a height in a level direction of said image signal.

* * * * *